United States Patent
Souentie et al.

(10) Patent No.: US 9,685,675 B2
(45) Date of Patent: Jun. 20, 2017

(54) SULFUR MANAGEMENT AND UTILIZATION IN MOLTEN METAL ANODE SOLID OXIDE FUEL CELLS

(71) Applicant: Saudi Arabian Oil Company, Dhahran (SA)

(72) Inventors: Stamatios Souentie, Dhahran (SA); Yasmeen A. Dawsari, Al-Khobar (SA); Esam Zaki Hamad, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 461 days.

(21) Appl. No.: 14/263,442

(22) Filed: Apr. 28, 2014

(65) Prior Publication Data

US 2015/0311545 A1 Oct. 29, 2015

(51) Int. Cl.
*H01M 8/04* (2016.01)
*H01M 8/12* (2016.01)
(Continued)

(52) U.S. Cl.
CPC ......... *H01M 8/1246* (2013.01); *H01M 4/905* (2013.01); *H01M 4/9033* (2013.01); *H01M 8/0675* (2013.01); *H01M 8/22* (2013.01); H01M 2008/1293 (2013.01); Y02E 60/525 (2013.01); Y02P 70/56 (2015.11)

(58) Field of Classification Search
CPC combination set(s) only.
See application file for complete search history.

(56) References Cited

U.S. PATENT DOCUMENTS

| 3,249,522 A | 5/1966 | Bolmer |
| 3,503,808 A | 3/1970 | Agruss et al. |

(Continued)

FOREIGN PATENT DOCUMENTS

WO 2007112435 A2 10/2007

OTHER PUBLICATIONS

Lagrille, et al., "Kinetics of Solid oxide Fuel Cells wtih Molten Tin Anodes", Abstract #219, 223rd ECS Meeting, The Electrochemical Society, 2013.
(Continued)

*Primary Examiner* — Kaity Chandler
(74) *Attorney, Agent, or Firm* — Dinsmore & Shohl LLP

(57) ABSTRACT

Embodiments of a molten metal anode solid oxide fuel cell (MMA-SOFC) system comprise a first MMA-SOFC and a second MMA-SOFC, a fuel contactor integral with the first MMA-SOFC or in fluid communication with the first MMA-SOFC, a molten metal conduit configured to deliver molten metal from a first molten metal anode to a second molten metal anode, and one or more external electric circuits, wherein a first molten metal anode is configured to oxidize molten metal to produce metal oxides and electrons, the fuel contactor is configured to reduce the metal oxides and produce metals and metal sulfides in the molten metal upon reaction with sulfur-containing fuel. The second molten metal anode is configured to oxidize the metal sulfides in the metal sulfides-containing molten metal to produce metals and electrons, and the external electric circuits are configured to generate power from the electrons produced in the first and second MMA-SOFCs.

35 Claims, 15 Drawing Sheets

(51) Int. Cl.
| | |
|---|---|
| H01M 4/90 | (2006.01) |
| H01M 8/1246 | (2016.01) |
| H01M 8/0662 | (2016.01) |
| H01M 8/22 | (2006.01) |
| H01M 8/124 | (2016.01) |

(56) References Cited

U.S. PATENT DOCUMENTS

| | | | |
|---|---|---|---|
| 4,826,740 A | 5/1989 | Costa | |
| 4,920,015 A | 4/1990 | Sammells | |
| 5,348,812 A | 9/1994 | Cocks et al. | |
| 5,541,014 A * | 7/1996 | Micheli | H01M 8/04089 429/415 |
| 5,578,189 A | 11/1996 | Joshi | |
| 6,475,653 B1 * | 11/2002 | Gomez | H01M 4/86 429/105 |
| 6,572,996 B1 * | 6/2003 | Isenberg | H01M 8/0625 429/422 |
| 7,943,271 B2 | 5/2011 | Tao et al. | |
| 8,101,310 B2 | 1/2012 | Lipilin et al. | |
| 8,518,598 B1 | 8/2013 | Yamanis | |
| 2002/0157988 A1 | 10/2002 | Jossens et al. | |
| 2005/0129995 A1 * | 6/2005 | Kato | C01B 3/323 429/170 |
| 2005/0153186 A1 * | 7/2005 | Hilmi | H01M 4/8621 429/473 |
| 2006/0234098 A1 | 10/2006 | Gur | |
| 2006/0257702 A1 * | 11/2006 | Gur | H01M 8/0643 429/410 |
| 2011/0014526 A1 | 1/2011 | Guer | |
| 2012/0231366 A1 | 9/2012 | Washsman et al. | |
| 2013/0026409 A1 * | 1/2013 | Baker | H01M 2/14 252/62.2 |

OTHER PUBLICATIONS

Jayakumar, et al., "Molten-Metal Electrodes for Solid Oxide Fuel Cells", Industrial & Engineering Chemistry Research, vol. 49, No. 21, May 26, 2010, pp. 10237-10241.
Jayakumar, et al., "A Direct Carbon Fuel Cell With a Molten Antimony Anode", Energy & Environ. Sci., Aug. 11, 2011, pp. 4133-4137.
Jayakumar, et al., "Molten Silver As a Direct Carbon Fuel Cell Anode", Journal of Power Sources, Sep. 2012, vol. 214, pp. 239-243.
Jayakumar, et al., "The Stability of Direct Carbon Fuel Cells With Molten Sb and Sb—Bi Alloy Anodes" AIChE Journal, Sep. 2013, vol. 59, Issue 9, pp. 3342-3348.
Jayakumar, et al., "A Comparison of Molten Sn and Bi for Solid Oxide Fuel Cell Anodes" University of Pennsylvania, Jan. 19, 2010, vol. 157(3), pp. B365-B369.
Nielsen, et al., "Partitioning of Coal Contaminates in the Components of Liquid Tin Anode Solid Oxide Fuel Cells", Journal of Power Sources, vol. 211, Aug. 1, 2012, pp. 192-201.
Abernathy, et al., "Basic Properties of a Liquid Tin Anode Solid Oxide Fuel Cell", Journal of Power Sources, vol. 196, Issue 10, May 15, 2011, pp. 4564-4572.
Ju, et al., "Enhanced Anode Interface for Electrochemical Oxidation of Solid Fuel in Direct Carbon Fuel Cells: The Role of Liquid Sn in Mixed State", Journal of Power Sources, vol. 198, Jan. 15, 2012, pp. 36-41.
Toleuova, et al., "A Review of Liquid Metal Anode Solid Oxide Fuel Cells", J. Electrochem Sci. Eng., 2013, doi: 10.5599, pp. 91-105.
Spivey, "Deactivaton of Reforming Catalysts, in Fuel Cells: Technologies for Fuel Processing", Technology & Engineering, Chapter 10, Mar. 18, 2011, pp. 285-315.
Yentekakis, et al., "Chemical Cogeneration in Solid Electrolyte Cells", J. Electromchemical Society, Apr. 4, 1989, vol. 136, pp. 996-1002.
Pujare, et al., "An Electrochemical Claus Process for Sulfur Recovery", 1989, vol. 136, Issue 12, pp. 3662-3678.
Aguilar, et al., "A Solid Oxide Fuel Cell Operating on Hydrogen Sulfide (H2S) and Sulfur-Containing Fuels", J. Power Sources 135, Sep. 3, 2014, pp. 17-24.
Vorontsov, et al., "Synthesis and Characterization of New Ternary Transition Metal Sulfide Anodes for H2S-Powered Solid Oxide Fuel Cell", Journal of Power Sources, vol. 183, Issue 1, Aug. 15, 2008, pp. 76-83.
Wei, et al., "Li2So4-Based Proton Conducting Membranes for H2S-Air Fuel Cell", Journal of Power Sources, Jul. 4, 2005, vol. 145, Issue 1, pp. 1-9.
Peterson, et al., "A Hydrogen Sulfide Fuel Cell Using a Proton-Conducting Solid Electrolyte", 1996 vol. 143, Issue 3, Lines 55-56, 1996.
Chen, et al., "Proton Conductive YSZ-Phosphate Composite Electrolyte for H2S SOFC", Ceramics International, Sep. 2010, vol. 36, Issue 7, pp. 2163-2167.
Chuang, et al., "Evolution of Fuel Cells Powered by H2S-Containing Gases", Chemical Industry and Chemical Engineering Quarterly, 2008, vol. 14, Issue 2, pp. 69-76.
Liu et al., "Performance of a solid oxide fuel cell utilizing hydrogen sulfide as fuel", Journal of Power Sources, vol. 94, No. 1, pp. 20-25, 2001.
Aguilar et al., "Sulfur Tolerant Materials for Hydrogen Sulfide Solid Oxide Fuel Cells", SECA Core Technology Program Review Meeting, Sep. 30, 2003.
Search Report for Application No. PCT/US2015/025668 dated Jan. 22, 2016.

* cited by examiner

SULFUR MANAGEMENT AND UTILIZATION IN MOLTEN METAL ANODE SOLID OXIDE FUEL CELLS

BACKGROUND

Field

Embodiments of the present disclosure generally relate to molten metal anode solid oxide fuel cells (MMA-SOFCs) and, more specifically relate to a MMA-SOFC system which includes a second MMA-SOFC configured to generate electricity from a metal sulfide byproduct.

Technical Background

As is conventionally known, a fuel cell consists of three major parts; an anode, where electrochemical oxidation takes place, a cathode, where electrochemical reduction takes place and the electrolyte membrane, which is a dense, gas impermeable, ion transport membrane which exhibits purely ionic or mixed ionic-electronic conductivity at a specific temperature range. Cathodes produce oxygen ions which then migrate through the electrolyte membranes to the anode electrode. The oxygen ions oxidize the fuel in the anode and thereby produce electrons, which flow through an external electrical circuit back to the cathode, thereby generating electrical energy.

Referring to FIG. 1, conventional molten metal anode solid oxide fuel cells 10 (MMA-SOFCs), include a molten metal anode 40. The molten metal 41 (also called molten metal bath or molten melt), which is oxidized in the molten metal anode 40, is kept in liquid phase by maintaining the operating temperature above the melting point of the metals and metal oxides 42 therein. The molten metal anode 40 is in contact with the solid electrolyte 30 and may also be exposed to fuel (gas, liquid or solid), for example, a sulfur containing fuel. In the cathode 20, which performs $O_2$ (g) reduction of the cathode metal in the presence of air to yield oxygen ions, is placed on the opposing side of the solid electrolyte 30. For current collection at the anode 40, a metal wire 72, or any other electron conducting material that is solid and inert at the operating conditions, may be immersed in the anode melt 41 to facilitate collection of the electrons which travel back to the cathode 20 via electrical circuit 70.

Referring again to FIG. 1, a metal/metal oxide cycle is used such that metal is electrochemically oxidized to metal oxide in the anode 40 and is then reduced by the fuel. This reduction by the fuel regenerates the metal from the metal oxide. When sulfur compounds exist in the fuel, metal sulfides 46 form and may detrimentally inhibit the metal oxide 42 reduction in the molten metal 41 by the fuel. Sulfur contaminations in the fuel can also degrade the performance of the MMA-SOFC and even poison the cell, due to the formation of metal sulfides. Metal sulfides, which form at the fuel/anode interface, are lighter than both the molten metal 41 and the metal oxides 42 and thus float to the top of the molten metal 41 bath. This inhibits the reduction of the metal oxide 42 species by the fuel, as well as the anode recycling and fuel cell operation.

Accordingly, ongoing needs exist for MMA-SOFC systems which provide improved handling and utilization of sulfide byproducts.

SUMMARY

Referring to FIG. 3, embodiments of the present disclosure are directed to a second molten metal solid oxide fuel cell (MMA-SOFC) 110 used to electrochemically oxidize metal sulfide species produced in a first MMA-SOFC 10 and produce $SO_2$ (g), metal species (and/or metal oxide), and electrons, which are used to generate electricity. In essence, the present MMA-SOFC system 5 is able to generate electricity in both the first and second MMA-SOFCs 10 and 110, and thus is considered as co-generating electricity. The systems of the present disclosure have industrial applicability, specifically in the Oil & Gas and Power industries due to the continuously increasing concentration of sulfur in Oil & Gas reservoirs, and the enhanced demand for electricity in treatment plants and off-grid remote locations.

According to one embodiment, an MMA-SOFC system is provided. The system comprises a first MMA-SOFC comprising a first cathode, a first molten metal anode, and a first solid electrolyte disposed between the first cathode and the first molten metal anode, and a second MMA-SOFC comprising a second cathode, a second molten metal anode, and a second solid electrolyte disposed between the second cathode and the second molten metal anode. The system further comprises a molten metal conduit configured to deliver molten metal from the first molten metal anode to the second molten metal anode, a fuel contactor integral with the first MMA-SOFC or in fluid communication with the first MMA-SOFC, and one or more external electric circuits. The first molten metal anode comprises an oxidation region configured to oxidize the molten metal to produce metal oxides and electrons, and the fuel contactor comprises a regeneration region configured to reduce the metal oxides and produces metal sulfides in the molten metal upon reaction with sulfur-containing fuel. Further, the second molten metal anode is configured to oxidize the metal sulfides in the metal sulfides-containing molten metal to produce metals and electrons, and the external electric circuits are configured to generate power from the electrons produced in both the first MMA-SOFC and the second MMA-SOFC.

For clarity, the first molten metal anode is the region of the first MMA-SOFC where electrochemical oxidation of the metal in the molten metal takes place, and the second molten metal anode is the region of the second MMA-SOFC where electrochemical oxidation of the metal sulfides in the molten metal takes place. The anodes share the molten metal bath, even though the molten metal is compositionally different at the first molten metal anode and the second molten metal anode, i.e., the molten metal is more sulfide rich upon delivery to the second molten metal anode than upon delivery to the first molten metal anode.

In an alternative MMA-SOFC system embodiment, the system may comprises a fuel contactor in fluid communication with the first MMA-SOFC and the second MMA-SOFC, wherein the fuel contactor comprises a regeneration region configured to produce metals via reduction of metal oxides in a metal oxides-containing molten metal stream delivered by the first molten metal anode, and a sulfation region configured to produce metal sulfides from metals in a molten metal stream delivered by the second molten metal anode.

In a further embodiment, a method for co-generating electricity in two separate MMA-SOFCs is provided. The method comprises producing metal oxides and electrons by oxidizing molten metal in a first molten metal anode of a first MMA-SOFC, producing metal and metal sulfides by reacting the molten metal and metal oxides with a sulfur containing fuel, producing metal oxides and electrons by oxidizing the metal sulfides in a second molten metal anode of a second MMA-SOFC, and co-generating electricity by collecting the electrons from the first MMA-SOFC and the second MMA-SOFC in an external electric circuit.

In yet another embodiment, a method for generating electricity from metal sulfide in a, individual molten metal anode solid oxide fuel cells (MMA-SOFC) is provided. The method comprises the steps of: providing a MMA-SOFC comprising a cathode, a molten metal anode, a solid electrolyte disposed between the cathode and the molten metal anode, wherein the MMA-SOFC is in fluid communication with a fuel contactor; producing metal sulfides and $H_2$ in a molten metal stream by reacting the molten metal with an producing metal sulfides and $H_2$ in a molten metal stream by reacting molten metal with a sulfur-containing fuel comprising only $H_2S$ or one or more of $H_2S$, sulfur, sulfones, sulfoxides or combinations thereof, producing metals and electrons by oxidizing the metal sulfides in the molten metal anode of the MMA-SOFC, and generating electricity by collecting the electrons from the MMA-SOFC in an external electric circuit.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of the molten metal solid oxide fuel cell system of the present disclosure. Though the system of FIGS. 2-8 is provided as exemplary, it should be understood that the present systems and methods encompass other configurations.

Figure 2:
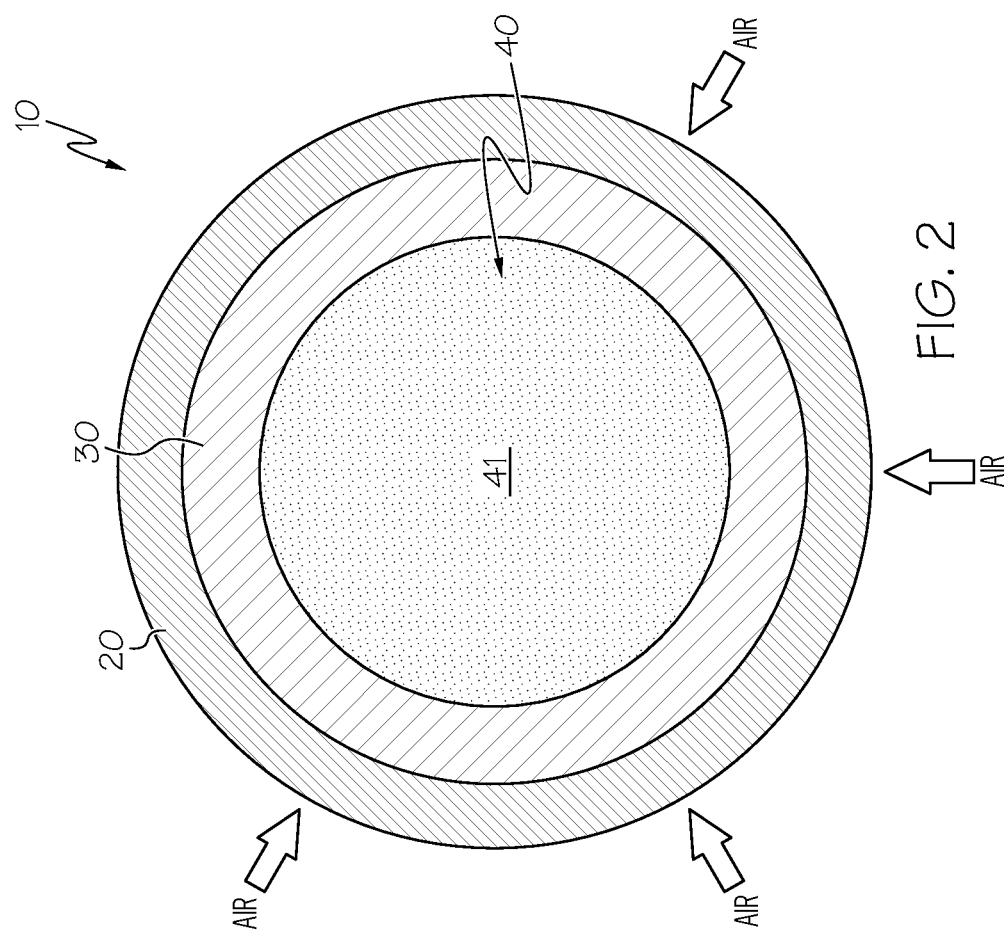
FIG. 2 is a front cross-sectional view of a tubular MMA-SOFC.
Figure 3:
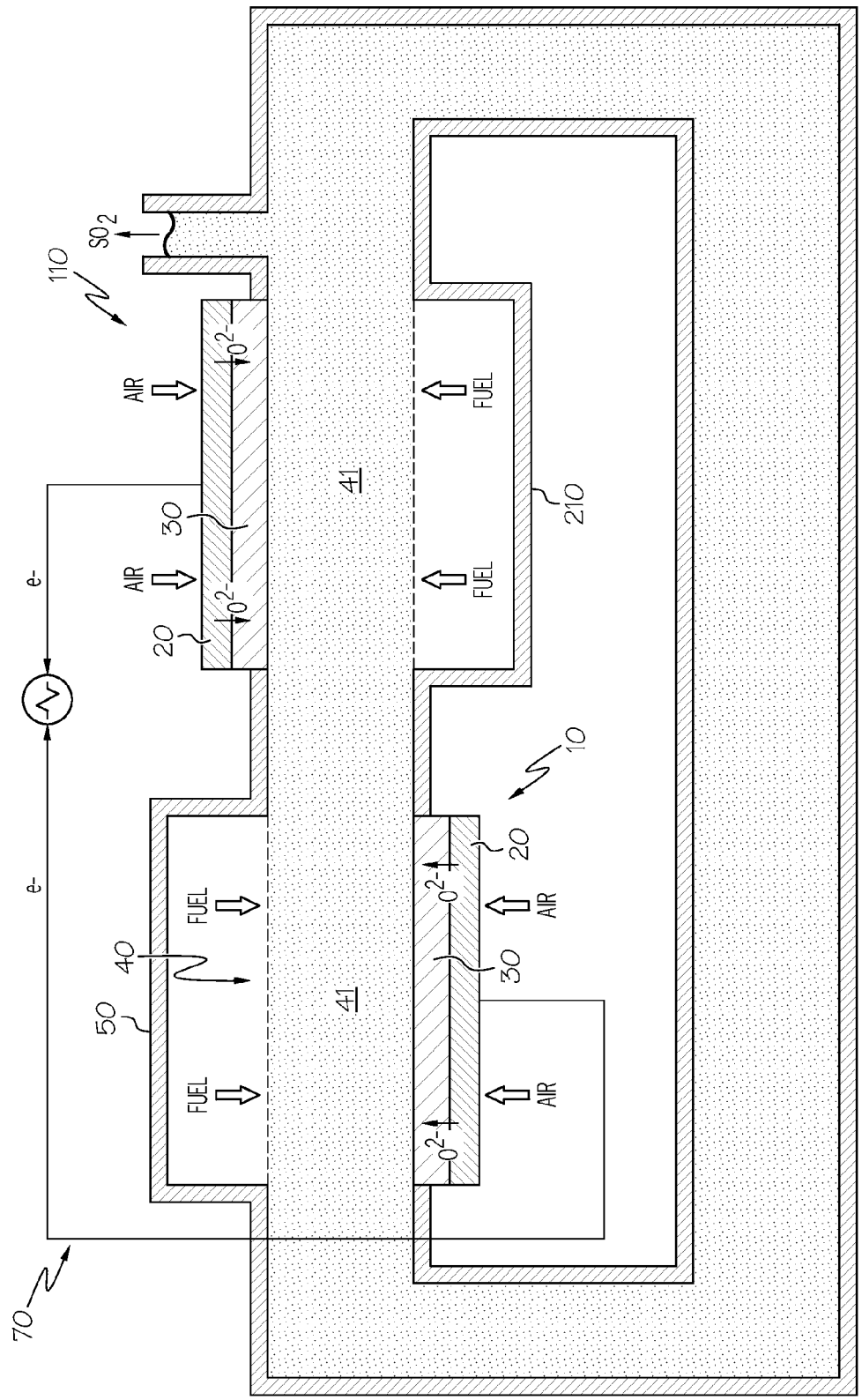
FIG. 3 depicts a MMA-SOFC system with a planar design in conjunction with a second MMA-SOFC that electrochemically oxidizes metal sulfides to co-generate electricity, in accordance with one or more embodiments of the present disclosure.

Referring to the embodiment of FIG. 3, a molten metal anode solid oxide fuel cell (MMA-SOFC) system 5 is shown. The system 5 comprises a first MMA-SOFC 10 and a second MMA-SOFC 110. As used herein, "first" is used to define components associated with the first MMA-SOFC 10 which produces electricity via the electrochemical oxidation of metal to metal oxides, whereas "second" is used to define components associated with the second MMA-SOFC 110 which produces electricity via the electrochemical oxidation of metal sulfides. As shown in FIGS. 2 and 3, the first MMA-SOFC 10 comprises a first cathode 20, a first molten metal anode 40, and a first solid electrolyte 30 disposed between the first cathode 20 and the first molten metal anode 40. Similarly, referring to FIG. 3, the second MMA-SOFC 110 comprises a second cathode 120, a second molten metal anode 140, and a second solid electrolyte 130 disposed between the second cathode 120 and the second molten metal anode 140. As used herein, "between" does not necessarily mean directly contacting, and contemplates that additional components are suitable between the MMA-SOFC anode, cathode, or electrolyte.

As shown in FIG. 3 there is a molten metal conduit 80 configured to deliver molten metal 41 from the first molten metal anode 40 to the second molten metal anode 140. In short, the molten metal 41 is recycled between and used by the first molten metal anode 40 and the second molten metal anode 140. Various embodiments are contemplated for the molten metal conduit 80, for example, piping or tubing. While not specifically shown, the molten metal conduit may include valves, pumps, or any other suitable device which aids or regulates the flow of molten metal 41 between the first molten metal anode 40 and the second molten metal anode 140.

Figure 1:
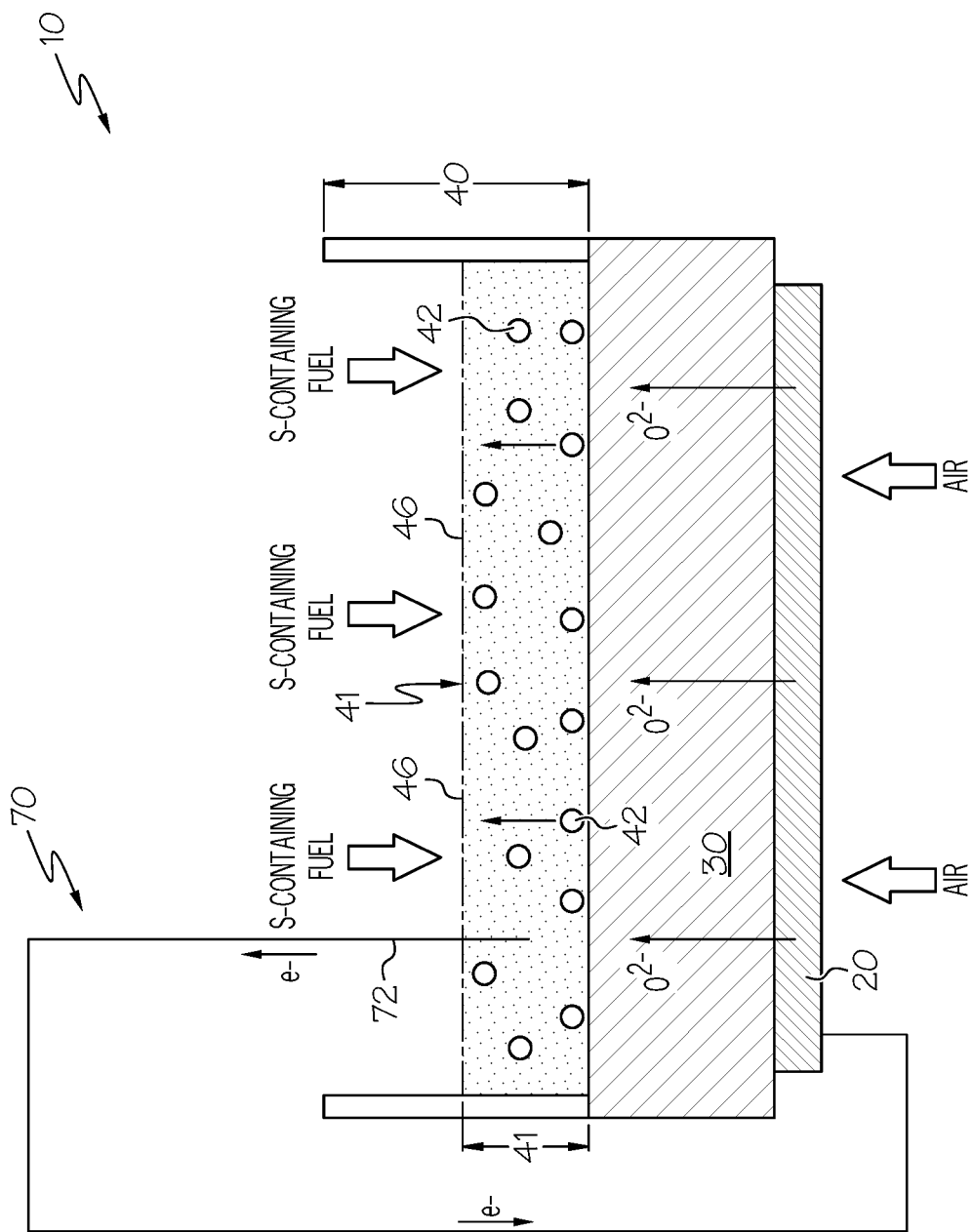
FIG. 1 is a schematic illustration of a conventional MMA-SOFC.

Moreover, as shown in FIG. 3, the MMA-SOFC system 5 comprises one or more external electric circuits 70, which collect electrons from the first molten metal anode 40 and the second molten metal anode 140 to generate electricity. As shown in FIG. 1, the external electrical circuit 70 may comprise a wire, or any other electron conducting material that is solid and inert at the operating conditions, in the first and/or second molten metal anodes 40 and 140 to facilitate collection of the electrons which travel back to the first cathode 20 or second cathode 120 via electrical circuit 70. While separate external circuits are contemplated for each MMA-SOFC, it is also contemplated that the first and second MMA-SOFCs 10 and 110 may share the external circuits used in the co-generation of electrical energy. As used herein, "co-generation" is the collection of electricity from the first MMA-SOFC 10 and the second MMA-SOFC 110. While "co-generation" is often used in the literature to denote that chemicals and electricity are produced simultaneously in a fuel cell, it is used herein to represent the dual collection of electricity in the first MMA-SOFC 10 and the second MMA-SOFC 110

In operation as shown in FIG. 3, the first cathode reduces the $O_2$ in the inlet air stream in accordance with the following reaction (R1):

$$O_2(g)+4e^- \rightarrow 2O^{2-} \quad (R1)$$

After the oxygen ions migrate through the first solid electrolyte 30, the first molten metal anode 40 comprises an oxidation region configured to oxidize the molten metal 41 to produce metal oxides 42 and electrons, which are used to generate electricity. (See also FIG. 1). As used herein, "oxidation region" encompasses the anode-electrolyte interface and any region of the first molten metal anode 40 wherein the oxygen ions may contact the molten metal 41. This electrochemical oxidation reaction is shown below:

$$xM(l)+yO^{2-} \rightarrow M_xO_y(l)+2ye^- \quad (R2)$$

Figure 4:
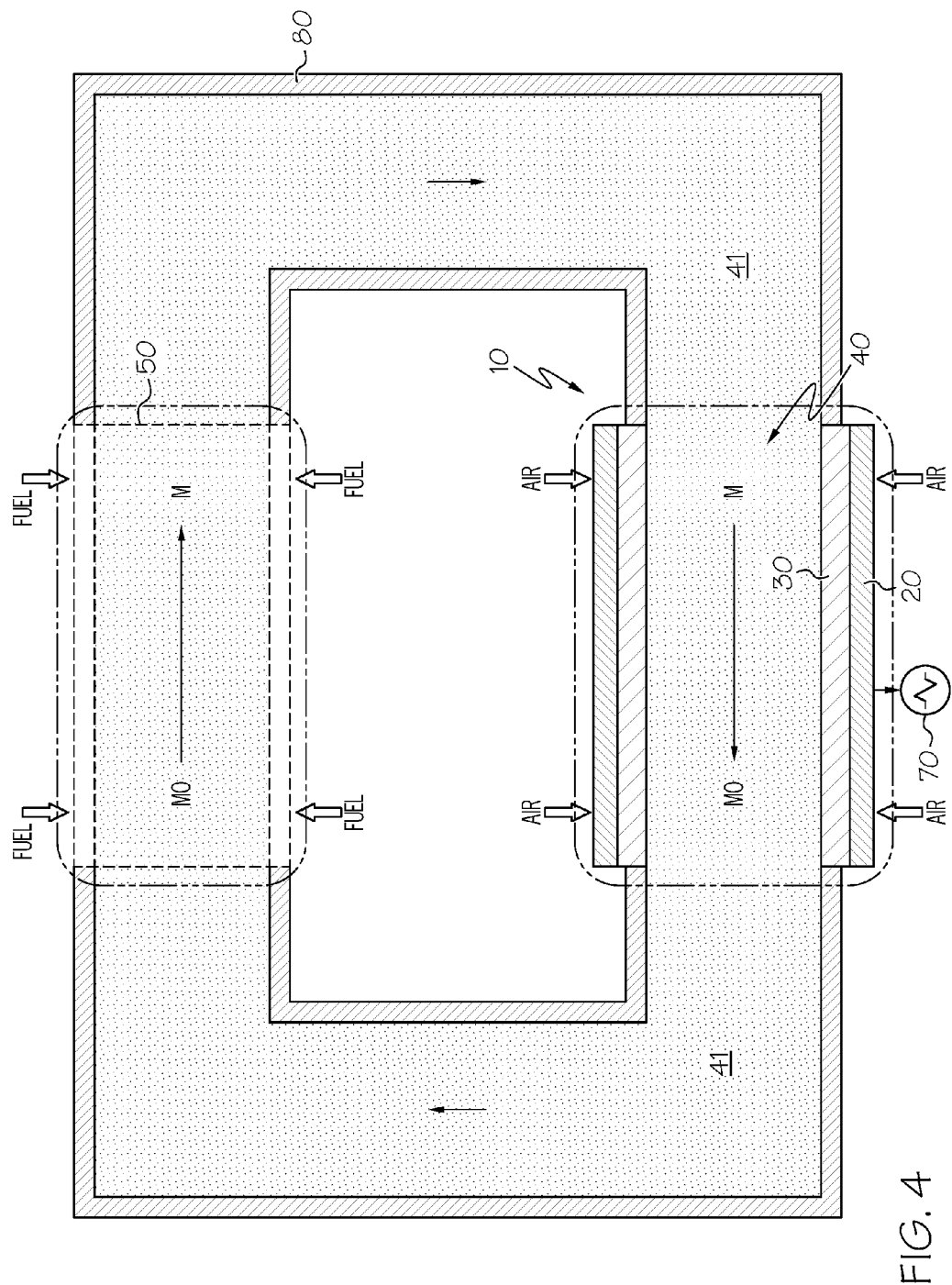
FIG. 4 depicts a side cross-sectional view of a first MMA-SOFC; however, the fuel regeneration step is conducted in a separate fuel contactor in accordance with one or more embodiments of the present disclosure.

Additionally as shown in FIGS. 1, 3, and 4, the MMA-SOFC system 5 may comprise a regeneration region configured to reduce the metal oxides 42 and produces metal sulfides 46 in the molten metal 41 upon reaction with sulfur-containing fuel. As used herein, "regeneration region" may encompass the contact area of the molten metal 41 and sulfur containing fuel. Referring to FIGS. 3 and 4, this regeneration may occur in a fuel contactor 50, which may be integral or adjacent the first MMA-SOFC 10 as depicted in FIG. 3 or separate but in fluid communication with the first MMA-SOFC 10 as depicted in FIG. 4. As shown in FIG. 1, the metal oxides 42, driven by density difference, to the top of the molten metal 41 where they are reduced by the fuel as shown in equation R3 below. The formed metal species return to the bottom of the melt and complete the cycle.

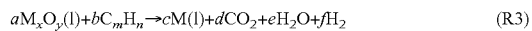

$$aM_xO_y(l)+bC_mH_n \rightarrow cM(l)+dCO_2+eH_2O+fH_2 \quad (R3)$$

According to reaction R3, hydrogen may be formed depending on the fuel used. As an additional embodiment (not shown), the $H_2$ may be used in situ for further metal oxide reduction or may be recycled for alternate use. When sulfur is present in the fuel, metal species react with sulfuric components (CHS) in presence of $H_2$ to form metal sulfide species and "upgraded" fuel according to reaction R4 (denoted in R4 below as $C_mH_z$). "Upgraded" fuel can be used in situ for further metal oxide reduction (similar to R3). While the person of ordinary skill in the art would consider various fuels to be suitable, the sulfur-containing fuel be a hydrogen fuel, carbon fuel, hydrocarbon fuel, hydrogen sulfide, low value solid sulfur and sulfones and sulfoxides originating from Oil &Gas and mixtures thereof

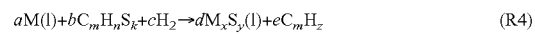

$$aM(l)+bC_mH_nS_k+cH_2 \rightarrow dM_xS_y(l)+eC_mH_z \quad (R4)$$

Without being bound by theory, carbon-containing fuels may be desirable since the reduction reaction with carbon containing fuel has a greater free energy (see Example below and FIGS. 12A and 12B).

As shown in the embodiment FIG. 4, after oxidation occurs in the first molten metal anode 40 of MMA-SOFC 10, the molten metal 41 may be transferred to a separate fuel contactor 50, which delivers fuel to the metal oxides containing molten metal. The dashed line in the fuel contactor 50 represents porous tubing, for example ceramic or metallic, which will allow only for fuel diffusion towards the molten metal 41 but will not allow the molten metal 41 to escape. Any porous contactor, which establishes a suitable contact surface area between the molten metal 41 and the fuel (gas, liquid or solid) can be used. For example, in case of gaseous fuel, a porous ceramic or metallic pipe could be used, where only the gaseous species can go through the pores (fuel inwards-diffusion and products back-diffusion). In the case of solid fuels, or gas/liquid fuels pyrolysis products, an opened-at-will container could be used instead, rather than a porous tube. Optionally, in case of inadequate melt flow rates, a pumping system could be also used, as well as a stirring system for the acceleration of the molten metal oxide 42 diffusion and thus the electrochemical reactions, in case of a mass (or heat) transfer limited process.

As stated above, the regeneration step yields metal sulfide byproducts. Referring to FIG. 3 and equations R5 and R6 below, the second molten metal anode 140 is configured to electrochemically oxidize the metal sulfides in the metal sulfides-containing molten metal 41 to produce metals or metal oxides and electrons.

$$M_xS_y+2yO^{2-} \rightarrow xM+ySO_2(g)+4ye^- \quad (R5)$$

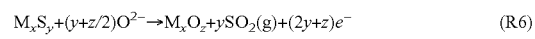

$$M_xS_y+(y+z/2)O^{2-} \rightarrow M_xO_z+ySO_2(g)+(2y+z)e^- \quad (R6)$$

The external electric circuits 70 generate power from the electrons produced in both the first MMA-SOFC 10 and the second MMA-SOFC 110.

While not shown, several conventional (e.g. utilizing the wasted heat from a furnace), non-conventional (i.e. renewable: solar photovoltaic (PV) or concentrated solar power (CSP), wind power, etc.), or combined heating methods can be used to achieve the required high operating temperature range of MMA-SOFCs 10 and 110. The compositions selected for the MMA-SOFC components are of major importance to ensure the long term stability and high operating performance of MMA-SOFCs 10 and 110.

For the molten metal 41 to be used in the first and second molten metal anodes 40 and 140, material properties such as the melting point of the metal, the metal oxide and the metal sulfide, as well as the density of the above three metal phases and the kinetics of the sulfation reaction have to be taken into account. Various compositions are contemplated for the metal of the first molten metal anode 40 and the second molten metal anode 140. For example, and not by way of limitation, the first molten metal anode 40 or the second molten metal anode 140 comprises metal selected from the group consisting of tin (Sn), bismuth (Bi), indium (In), lead (Pb), antimony (Sb), copper (Cu), molybdenum (Mo), mercury (Hg), iridium (Ir), palladium (Pd), rhenium (Re), platinum (Pt), silver (Ag), arsenic (As), rhodium (Rh), tellurium (Te), selenium (Se), osmium (Os), gold (Au), germanium (Ge), thallium (Tl), cadmium (Cd), gadolinium (Gd), chromium (Cr), nickel (Ni), iron (Fe), tungsten (W), cobalt (Co), zinc (Zn), vanadium (V), and combinations thereof. In an exemplary embodiment, the first molten metal anode 40 or the second molten metal anode 140 may comprise antimony. As shown below in Table 1, antimony is a suitable choice, because its melting points are relatively uniform whether antimony is in the form of a metal, an oxide, or a sulfide.

TABLE 1

| Metal | Phase | | |
|---|---|---|---|
| | metallic (° C.) | oxide (° C.) | sulfide (° C.) |
| $Sb/Sb_2O_3/Sb_2S_3$ | 630 | 656 | 550 |
| $Sn/SnO/SnS$ | 232 | 1080 | 882 |
| $Bi/Bi_2O_3/Bi_2S_3$ | 271 | 817 | 775 |
| $Te/TeO_2$ | 450 | 732 | |
| $Tl/Tl_2O/Tl_2S$ | 304 | 596 | 448 |

For the case of the first and second solid electrolytes 30 or 130, high ionic conductivity and negligible chemical interactions with the anode are required. That being said, various compositions are suitable for the first or second solid electrolyte 30 or 130, with the major requirement being oxygen ion conductivity. Suitable solid electrolytes may be either purely ionic or mixed ionic-electronic.

For example, and not by way of limitation, the first solid electrolyte 30 or the second solid electrolyte 130 may comprise zirconia based electrolytes or ceria based electrolytes. In specific embodiments, the zirconia-based electrolyte may be selected from the group consisting of yttria stabilized $ZrO_2$ (YSZ), scandia stabilized $ZrO_2$ (ScSZ), calcia stabilized $ZrO_2$ (CSZ) and combinations thereof. In an exemplary embodiment, the first solid electrolyte 30 or the second solid electrolyte 130 may comprise yttria stabilized $ZrO_2$ (YSZ). Alternatively, the ceria-based electrolytes may comprise rare earth doped ceria. For example, the ceria-based electrolytes are selected from the group consisting of gadolinium doped ceria (GDC), yttria doped ceria (YDC), samarium doped ceria (SmDC), and combinations thereof.

When selecting the composition for the first solid electrolyte 30 or the second solid electrolyte 130, the following factors should be considered: 1. any possible chemical interactions with any of the electrodes, which may have a catastrophic effect on the fuel cell; 2. the fuel cell operating temperature range; and 3. the ionic/electronic conductivity ratio value. As a result, combinations of two or more solid electrolytes may be used to ensure these factors are met. For example, in cases where a non-stable solid electrolyte (which interacts with the molten metal anode) is necessary to be used in the fuel cell due to its remarkable ionic conductivity at the desired operating temperature, a thin coating of a chemically stable solid electrolyte may be used at the electrolyte/anode interface to avoid direct contact between the anode and the solid electrolyte. The same technique can be used to block the electronic conductivity that a highly conductive mixed ionic-electronic solid electrolyte may exhibit at the desired temperature range. In that instance, a thin coating of a purely ionic conductor (e.g. YSZ) may be beneficial.

Figure 6:
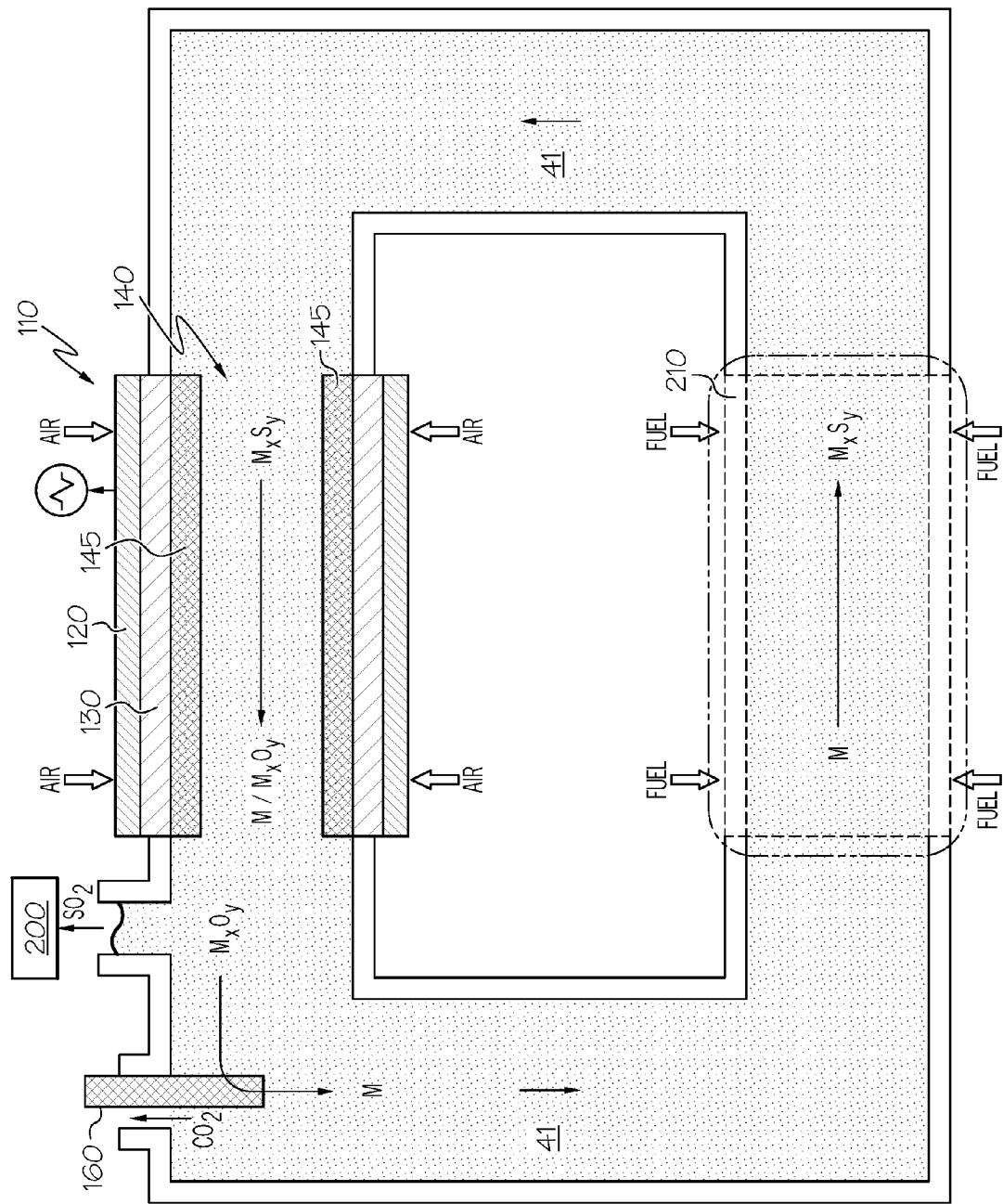
FIG. 6 is a side cross-sectional view of a second MMA-SOFC; however, the sulfation step is conducted in a separate fuel contactor in accordance with one or more embodiments of the present disclosure.

On the other hand, any cathodic material that exhibits low $O_2$ (g) reduction overpotential at the higher operating temperature range while having negligible interactions with the electrolyte could be used in the first cathode 20 and the second cathode 120. For example and not by way of limitation, the first cathode 20 or the second cathode 120 may comprise lanthanum strontium manganite (LSM), yttria stabilized $ZrO_2$/lanthanum strontium manganite (YSZ-LSM), lanthanum strontium cobalt ferrite (LSCF), and combinations thereof. In an exemplary embodiment, the first cathode or the second cathode may comprise lanthanum strontium manganite (LSM), Referring again to FIG. 3, in additional embodiments, it may be desirable to include a sulfation region for the second MMA-SOFC 110. As used herein, "sulfation region" encompasses the contact area of the molten metal 41 and sulfur-containing fuel to further produce metal sulfides, which may then be electrochemically oxidized to generate electricity. Referring to FIGS. 3 and 6, this sulfation may occur in a fuel contactor 210, which may be integral or adjacent the second MMA-SOFC 110 as depicted in FIG. 3 or separate but in fluid communication with the second MMA-SOFC 110 as depicted in FIG. 6. While separate fuel contactor units 50 and 210 have been discussed above for use in regeneration and sulfation, respectively, we will also discuss the fuel contactor 220 embodiment of FIG. 8, where the first MMA-SOFC 10 and the second MMA-SOFC 110 share the same fuel contactor 220 for regeneration and sulfation. As described above, these metal sulfides may be electrochemically oxidized in situ to further generate electricity. In an alternative embodiment shown in FIG. 6, the sulfation region may be included separately in a fuel contactor 210 in fluid communication with second MMA-SOFC 110. Like the fuel contactor used in the metal/metal oxide cycle depicted in FIG. 4, fuel contactor 210 may include porous tubing, for example ceramic or metallic, which will allow only for fuel diffusion towards the molten metal 41, but will not allow the molten metal 41 to escape.

Figure 7:
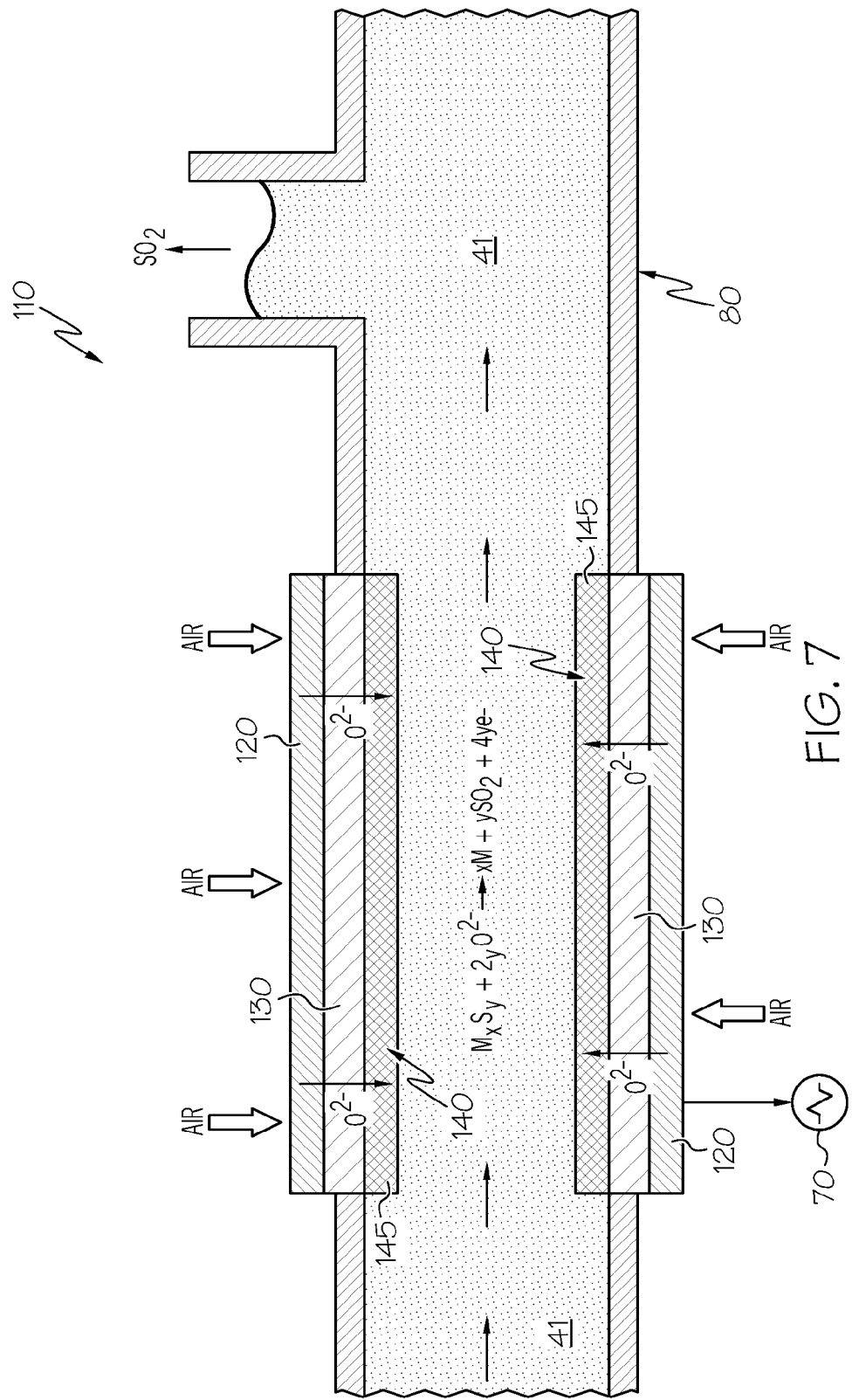
FIG. 7 is a side cross-sectional view of a second MMA-SOFC having a solid metal anode in addition to the molten metal anode in accordance with one or more embodiments of the present disclosure.

As described, the molten metal essentially serves as a sulfur carrier/capturing agent, the "actual" fuel of the second MMA-SOFC 110 and the second molten metal anode 140 of the second MMA-SOFC 110. However, in case of small electrocatalytic activity, a conventional solid porous metal/metal oxide anode 145 can be used additionally, as shown in FIGS. 6 and 7, to further enhance the electrochemical oxidation rate. While various configurations are contemplated, the second solid metal anode 145 is disposed between the second molten metal anode 140 and the second solid electrolyte 130. In operation, metal oxide species should be reduced to metal species and new metal sulfide species should be formed at the second solid metal anode 145. The latter will then be oxidized electrochemically by oxygen ionic species supplied from the second solid electrolyte 130, producing electricity and $SO_2$ (g).

Various metals suitable for oxidation may be utilized in the second solid metal anode 145, for example, a metal or metal ceramic. In one embodiment, the second solid metal anode 145 comprises a metal or ceramic-metallic material with lower susceptibility to sulfation (i.e., a less stable metal sulfide) than the metal of the molten metal anode, like iron (Fe), cobalt (Co), nickel (Ni), copper (Cu) and combinations thereof. In another embodiment, the second solid metal anode 145 may use Fe, and antimony (Sb) may be used in the molten metal 41. Other compositional combinations of the second solid metal anode 145 and the molten metal 41 are also within the scope of the present disclosure.

As previously discussed, metal oxides may also be formed electrochemically, in parallel with metal formation in the second molten metal anode 140, according to above side reaction R6. If metal oxide species are undesirable in the melt, then a sacrificial reducing agent (SRA) 160 may be used downstream of the second MMA-SOFC 110, as shown in FIG. 6. In one embodiment, the SRA 160 may be a graphite rod, which will reduce metal oxide species to metal and $CO_2$, or a metal (in solid phase) with higher susceptibility to oxidation than the metal of the molten metal anode. In embodiments where the SRA 160 is a graphite rod, the SRA 160 may have an adjacent opening to purge $CO_2$ from the system. A measure for susceptibility to oxidation of metals can be the metal oxide formation free energy, thus in case of Sb molten metal anode the metal of SRA could be one of the group iron (Fe), zirconium (Zr), manganese (Mn), tantalum (Ta), silicon (Si) or titanium (Ti) and combinations thereof. This part will have a limited lifetime and will be replaced when fully oxidized.

Figure 5:
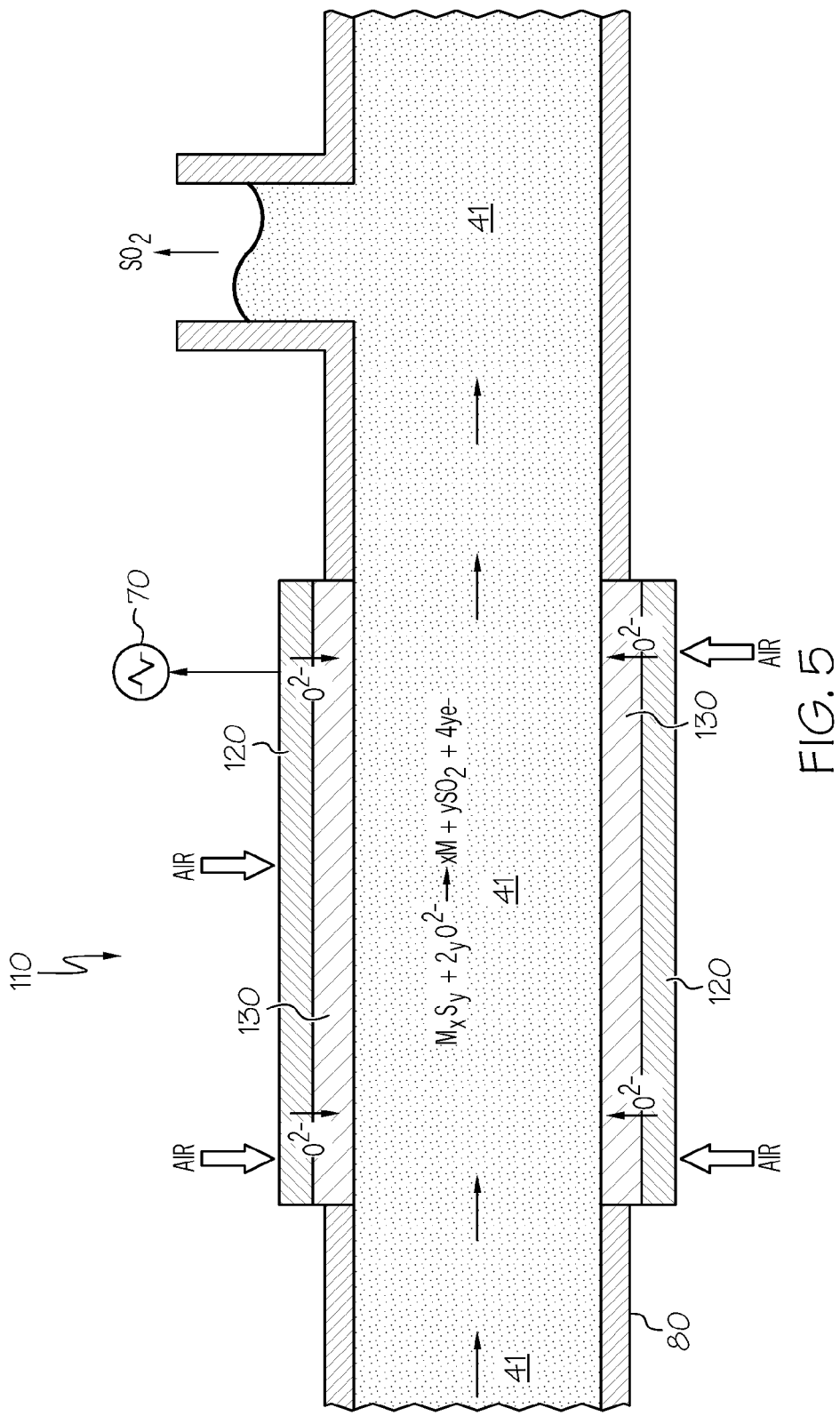
FIG. 5 is a side cross-sectional view of a second MMA-SOFC that electrochemically oxidizes metal sulfides, in accordance with one or more embodiments of the present disclosure.

Additionally, as shown in FIGS. 5-7, $SO_2$ removal and treatment equipment may be included downstream of the second molten metal anode 140. For example, the $SO_2$ removal equipment may comprise one or more units such as a wet scrubber unit, a spray-dry unit, a wet $H_2SO_4$ processing unit, a $SNO_X$ flue-gas desulfurization unit, and combinations thereof.

Alternatively as shown in FIG. 6, a catalytic unit, similar to the catalytic part of the Claus unit, 200 may be incorporated downstream of the second molten metal anode 140. This unit 200 being configured to utilize $SO_2$ byproduct to catalytically convert $H_2S$ to elemental sulfur. Generally, in a Claus unit, $H_2S$ (g) undergoes a substoichiometric combustion at T~1000° C. to form $SO_2$ (g) (R7), which then reacts with $H_2S$ (g) to form elemental sulfur (R8) below. The catalytic recovery of sulfur (R8) consists of three substeps: heating (~200-300° C.), catalytic reaction and cooling plus condensation. These three steps are normally repeated a maximum of three times

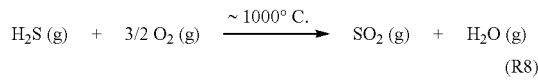

(R7)

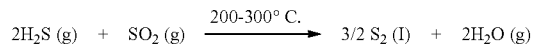

(R8)

Formed $S_2$ is highly reactive and thus, it combines exclusively to $S_8$ allotrope (R9).

(R9)

Without being bound by theory, the Claus process is a destructive process for the hydrogen atoms of $H_2S$, which are oxidized to $H_2O$ (g) (R7). While it does not result in any useful product for the refinery, apart from sulfur and steam at the heat exchangers, the integration of the catalytic section of the Claus unit that R8 takes place, by replacing the high temperature combustion furnace that R7 takes place with the electrochemical oxidation in the MMA-SOFC, is valuable.

Figure 8:
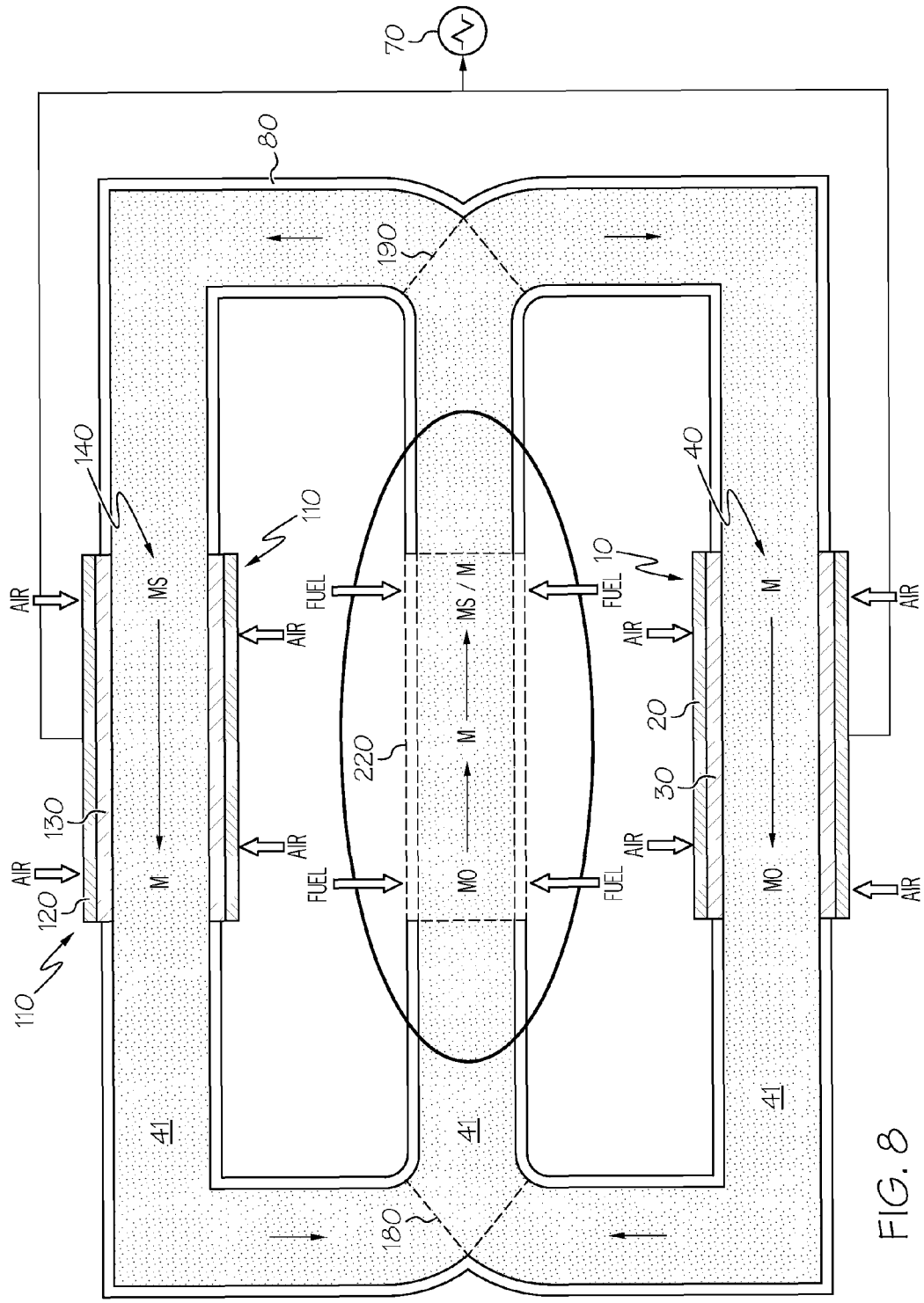
FIG. 8 depicts a hybrid MMA-SOFC system wherein a fuel contactor is integrated with the first and second MMA-SOFCs in accordance with one or more embodiments of the present disclosure.

Referring to FIG. 8, the first MMA-SOFC 10 and the second MMA-SOFC 110 may be oriented in a hybrid arrangement having a fuel contactor 220 in fluid communication with the first MMA-SOFC 10 and the second MMA-SOFC 110. The fuel contactor 220 comprises a regeneration region configured to produce metals via reduction of metal oxides in a metal oxides-containing molten metal stream delivered by the first molten metal anode 40, and a sulfation region configured to produce metal sulfides from metals in a molten metal stream delivered by the second molten metal anode 140. In essence, regeneration of metals from metal oxides for the first molten metal anode 40, and sulfation to produce metal sulfides for the second molten metal anode 140 is conducted in the same fuel contactor 220. As shown, the fuel contactor 220 is in fluid communication with the first MMA-SOFC 10 and the second MMA-SOFC 110, and the molten metal conduit 80 delivers molten metal 41 between the first molten metal anode 40, the second molten metal anode 140, and the fuel contactor 220.

As further shown, the molten metal conduit 80 may recycle metal sulfides produced in the sulfation region of the fuel contactor 220 back to the second molten metal anode 140, and may recycle metals produced in the regeneration region of the fuel contactor 220 back to the first molten metal anode 40.

Further as shown in FIG. 8, the dashed junction points 180 and 190 where metal oxide and metal species meet may include various components (e.g., pipes, valves, or pumps) which control the direction, volume, and velocity of the molten metal 41 to avoid possible undesirable backflow phenomena.

Referring again to FIG. 6, a further embodiment is directed to a sulfation region which utilizes $H_2S$ as a fuel to convert metal to metal oxides and also produce $H_2$ according to (R10) below. Molten metal 41 may undergo sulfation when in contact with $H_2S$ fuel to form metal sulfides. At the second MMA-SOFC 110, metal sulfides are electrochemically oxidized to form $SO_2$ (g) and metal species and also, depending on the ionic current density at the cell, metal oxide.

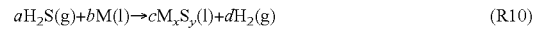

(R10)

As previously discussed, a potential function of the proposed process is to co-feed a hydrocarbon stream that contains organic sulfur compounds with the $H_2S$ (g) stream and utilize the hydrogen produced by $H_2S$, to in situ desulfurize the organic sulfur compounds. The case of molten antimony anode and dibenzothiophene organic sulfur compound is examined (R11 and R12). Sulfur from both $H_2S$ and organic sulfur compounds will be removed forming metal sulfide species, while hydrogen, recovered from $H_2S$ reduction on molten antimony, will be used in situ to saturate the two carbon atoms of dibenzothiophene, after removal of the sulfur atom to the molten metal (R12). The advantage of this desulphurization process is that does not require an external hydrogen source as the typical hydrotreating industrial processes, since it is in situ produced by desulfurizing $H_2S$ (g) (R11). Moreover, during metal sulfide regeneration, electrical energy will be generated, adding significantly to the value of the process.

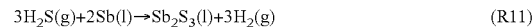

(R11)

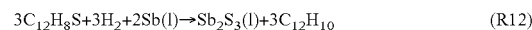

(R12)

In addition to the dual MMA-SOFC systems described above, additional embodiments of the present disclosure are directed to methods for generating electricity from metal sulfide byproducts using the single molten metal anode solid oxide fuel cell. While the second MMA-SOFC 110 has been described above as co-generating electricity in conjunction with the first MMA-SOFC 10, it is also contemplated the second MMA-SOFC 110 and a fuel contactor 210 in fluid communication with the second MMA-SOFC 110 may also generate electricity individually via the electrochemical oxidation of metal sulfides. In this embodiment, metal sulfides and $H_2$ are produced in the fuel contactor 210 by reacting the molten metal with a sulfur-containing fuel comprising only $H_2S$ or one or more of $H_2S$, sulfur, sulfones, sulfoxides or combinations thereof. Then, the metal-sulfide rich molten metal is oxidized in a molten metal anode of the MMA-SOFC 110 to produce metals and electrons, which may be used to generate electricity via an external electric circuit.

EXAMPLES

For illustration of one or more of the above embodiments, an exemplary system depicted in FIG. 8 has been provided below. In this exemplary system, antimony has been selected for the molten metal anode, since antimony (Sb), antimony oxide ($Sb_2O_3$) and antimony sulfide (stibnite—$Sb_2S_3$) melting points are 630°, 656° and 550° C. respectively. Moreover the densities of the species above are 6.53, 5.20 and 4.63 g/ml respectively.

As described previously in detail, the total process consists of two cycles: the metal/metal sulfide cycle and the metal/metal oxide cycle. As shown in FIG. 8, the fuel contactor 220 is common to the first and second MMA-SOFCs 10 and 110.

In this example, the following metal and metal sulfide electrochemical oxidation reactions take place (R13-R15):

$$2Sb(l) + 3O^{2-} \rightarrow Sb_2O_3(l) + 6e^-$$ (R13)

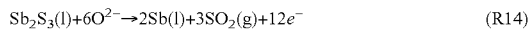
$$Sb_2S_3(l) + 6O^{2-} \rightarrow 2Sb(l) + 3SO_2(g) + 12e^-$$ (R14)

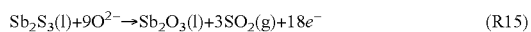
$$Sb_2S_3(l) + 9O^{2-} \rightarrow Sb_2O_3(l) + 3SO_2(g) + 18e^-$$ (R15)

Figure 9A:
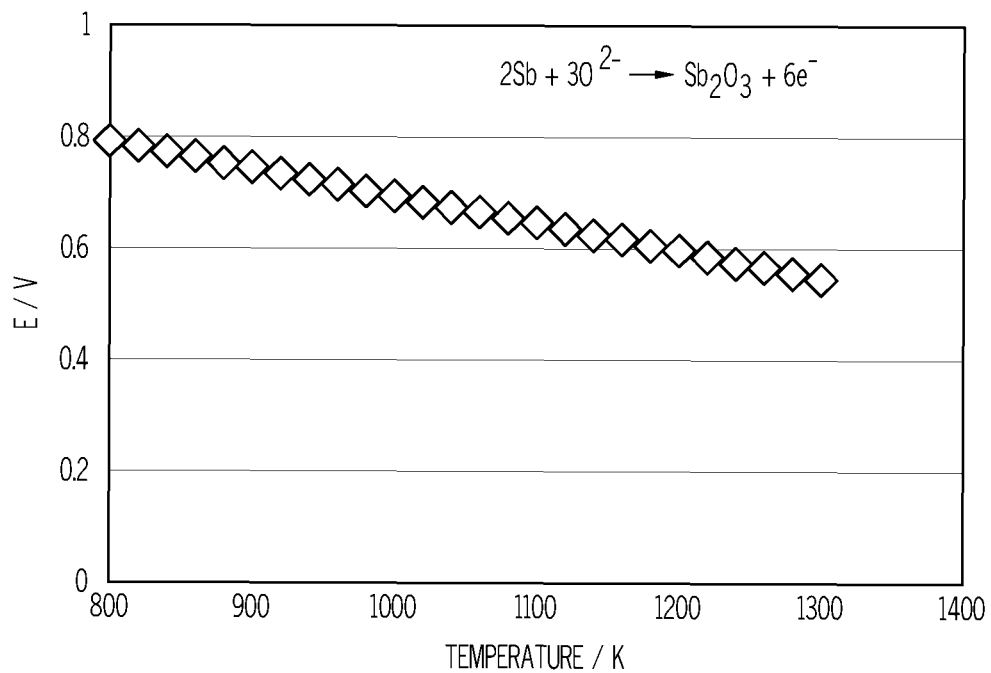
FIG. 9A is a graphical illustration depicting the effect of temperature on the reversible (maximum) potential of the electrochemical oxidation of metallic antimony.
Figure 9B:
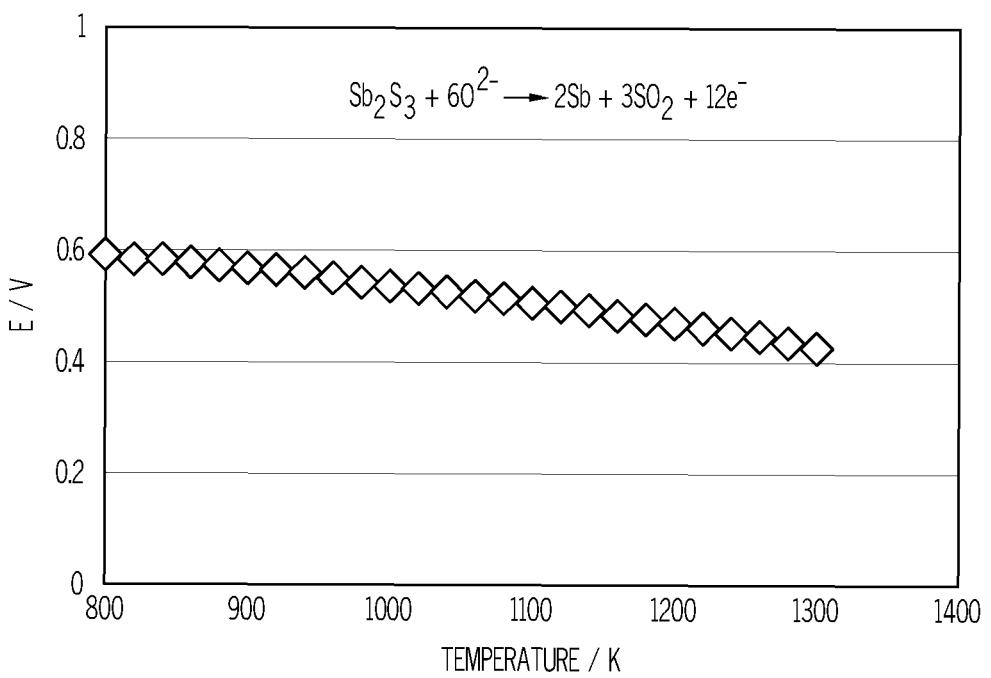
FIG. 9B is a graphical illustration depicting the effect of temperature on the reversible (maximum) potential of the electrochemical oxidation of antimony sulfide to metallic antimony.
Figure 9C:
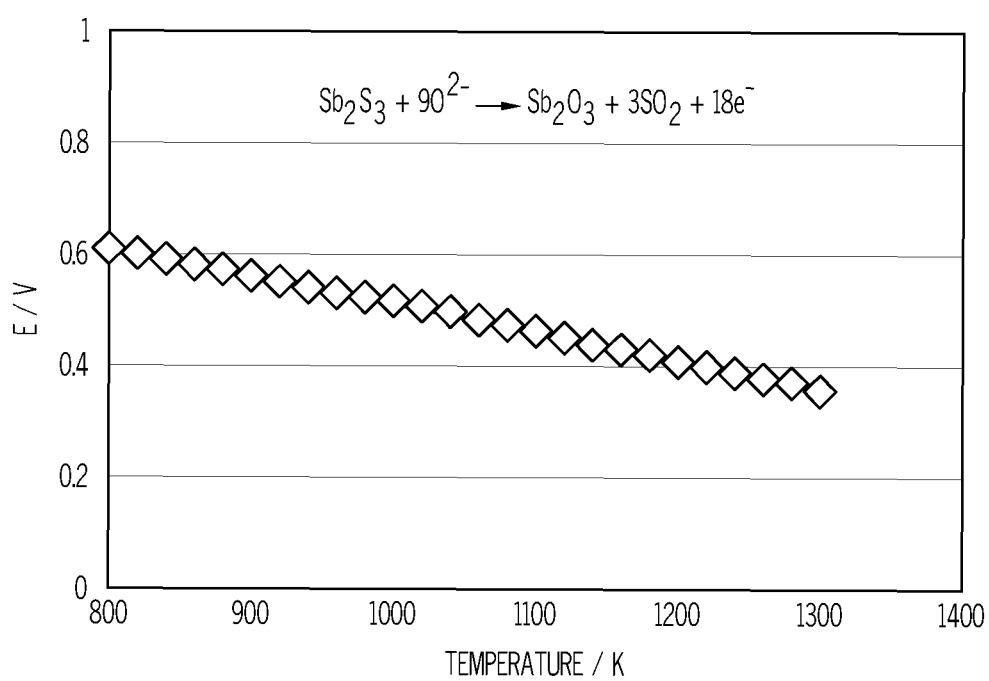
FIG. 9C is a graphical illustration depicting the effect of temperature on the reversible (maximum) potential of the electrochemical oxidation of antimony sulfide to antimony oxide ($Sb_2O_3$).
Figure 10A:
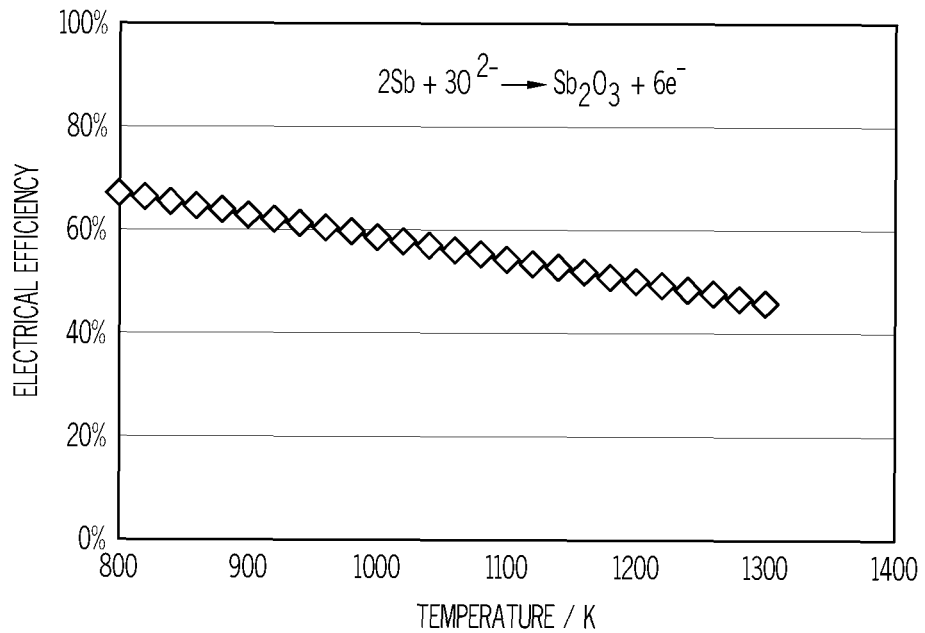
FIG. 10A is a graphical illustration depicting the effect of temperature on the electrical efficiency (eq. E2) of the electrochemical oxidation of metallic antimony.
Figure 10B:
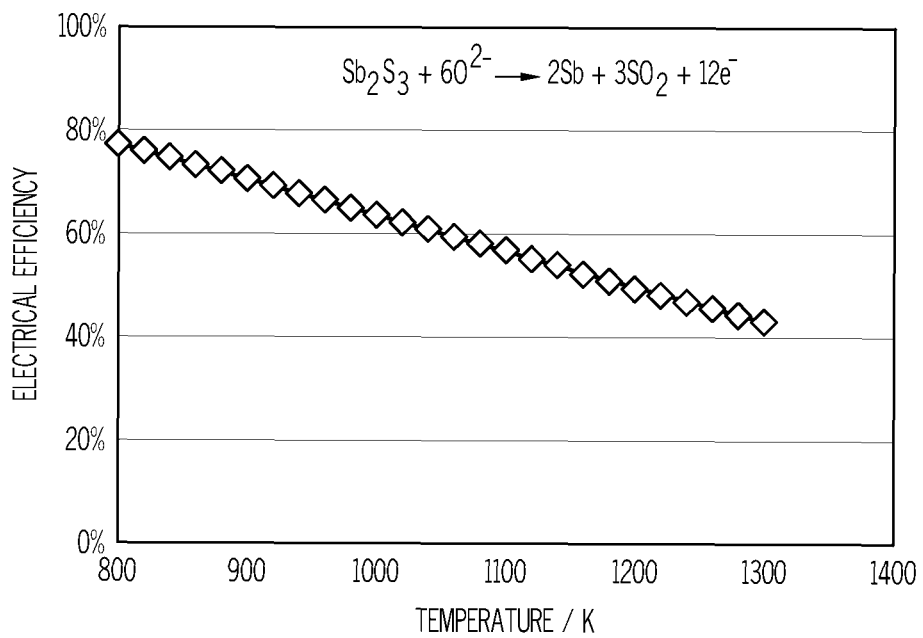
FIG. 10B is a graphical illustration depicting the effect of temperature on the electrical efficiency (eq. E2) of the electrochemical oxidation of the electrochemical oxidation of antimony sulfide to metallic antimony.
Figure 10C:
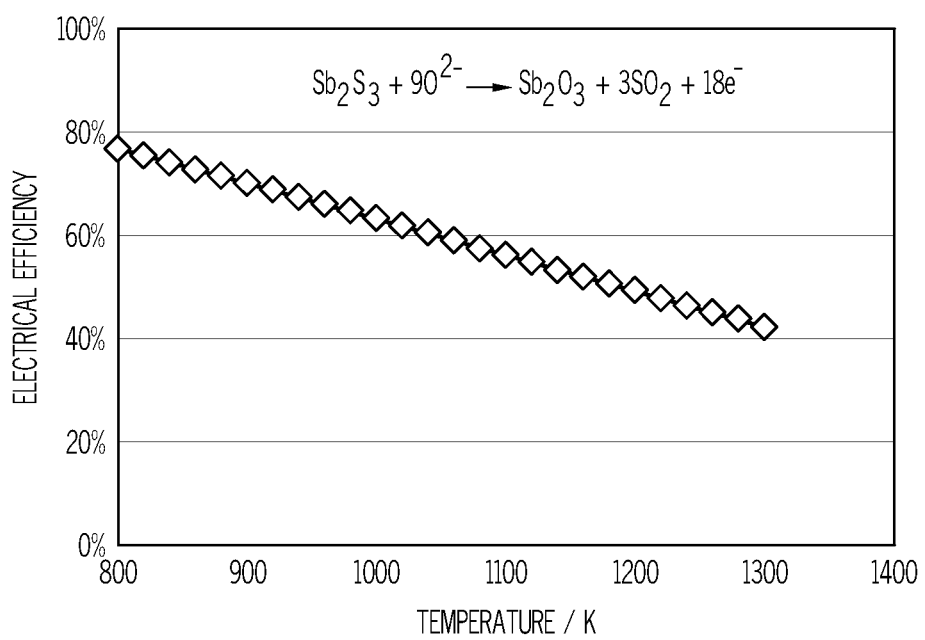
FIG. 10C is a graphical illustration depicting the effect of temperature on the electrical efficiency (eq. E2) of the electrochemical oxidation of the electrochemical oxidation of antimony sulfide to antimony oxide ($Sb_2O_3$).

FIGS. 9A-10C show the effect of temperature on the reversible (maximum) potential (FIGS. 9A-9C) and electrical efficiency (FIGS. 10A-10C) in the case of antimony oxidation (see FIGS. 9A and 10A), antimony sulfide oxidation to metallic antimony (see FIGS. 9B and 10B) and antimony sulfide oxidation to antimony oxide (see FIGS. 9C and 10C). The reversible potential of a reaction and the electrical efficiency are defined by:

$$E = \frac{-\Delta G^o_{R,T}}{nF}$$ (E1)

$$E1.\text{Efficiency} = \frac{\text{electrical work}}{\text{fuel heat value}} = \frac{\Delta G_{R,T}}{\Delta H_{R,T}}$$ (E2)

where $\Delta H_{R,T}$ and $\Delta G_{R,T}$ are the enthalpy and free energy of the reaction at T, n is the number of the transferred electrons and F the Faraday constant.

As shown in FIG. 9A-9C, in the case of molten Sb anode at 680° C. (953K), the reversible potential values for Sb oxidation (FIG. 9A), $Sb_2S_3$ oxidation to Sb (FIG. 9B) and $Sb_2S_3$ oxidation to $Sb_2O_3$ (FIG. 9C) are 0.73V, 0.58V and 0.57V, respectively. Thus, the production of power in the metal/metal sulfide cycle will be ~20% lower than in the metal/metal oxide cycle; however, it is a vast improvement over conventional systems which do not produce electrical energy by electrochemically oxidizing metal sulfides. The electrical efficiency values are shown in FIG. 10A-10C, where in the case of Sb oxidation as shown in FIG. 10A is ~60%, while in the case of $Sb_2S_3$ oxidation to Sb (as shown in FIG. 10B) or $Sb_2O_3$ (as shown in FIG. 10C) it is ~65%.

In this example, $Sb_2O_3$ is reduced to Sb by the hydrocarbon fuel, here octane ($C_8H_{18}$), and $H_2$ is formed (R16).

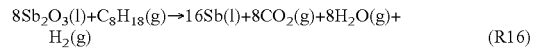
$$8Sb_2O_3(l) + C_8H_{18}(g) \rightarrow 16Sb(l) + 8CO_2(g) + 8H_2O(g) + H_2(g)$$ (R16)

Hydrogen can either be used to reduce metal oxide species, or to facilitate the desulfurization of organic sulfur compounds, when the latter are present in the fuel mixture.

Figure 11A:
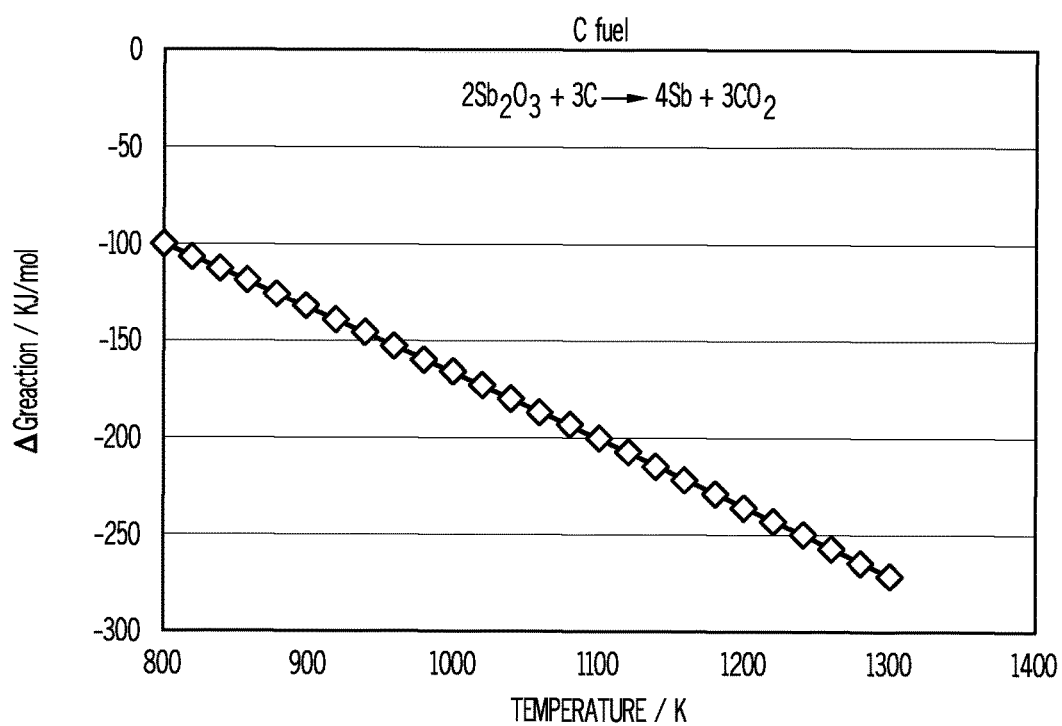
FIG. 11A is a graphical illustration depicting the effect of temperature on the free energy of the $Sb_2O_3$ reduction reaction ($\Delta G$) when using a graphite carbon fuel.
Figure 11B:
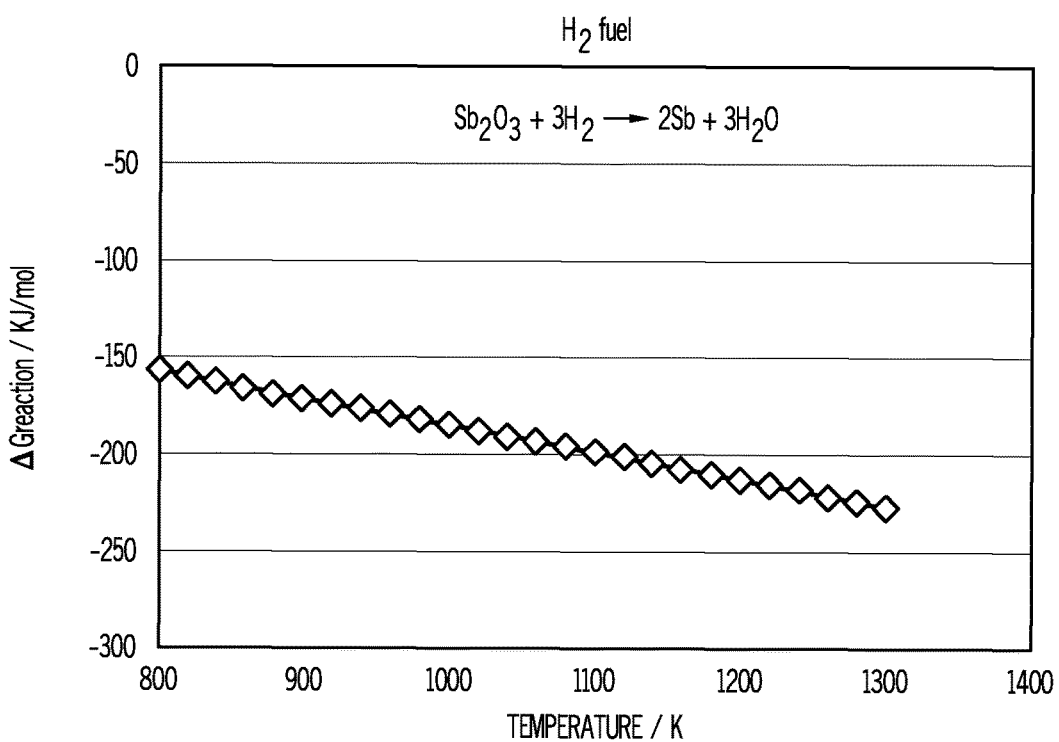
FIG. 11B is a graphical illustration depicting the effect of temperature on the free energy of the $Sb_2O_3$ reduction reaction ($\Delta G$) when using a hydrogen fuel.
Figure 11C:
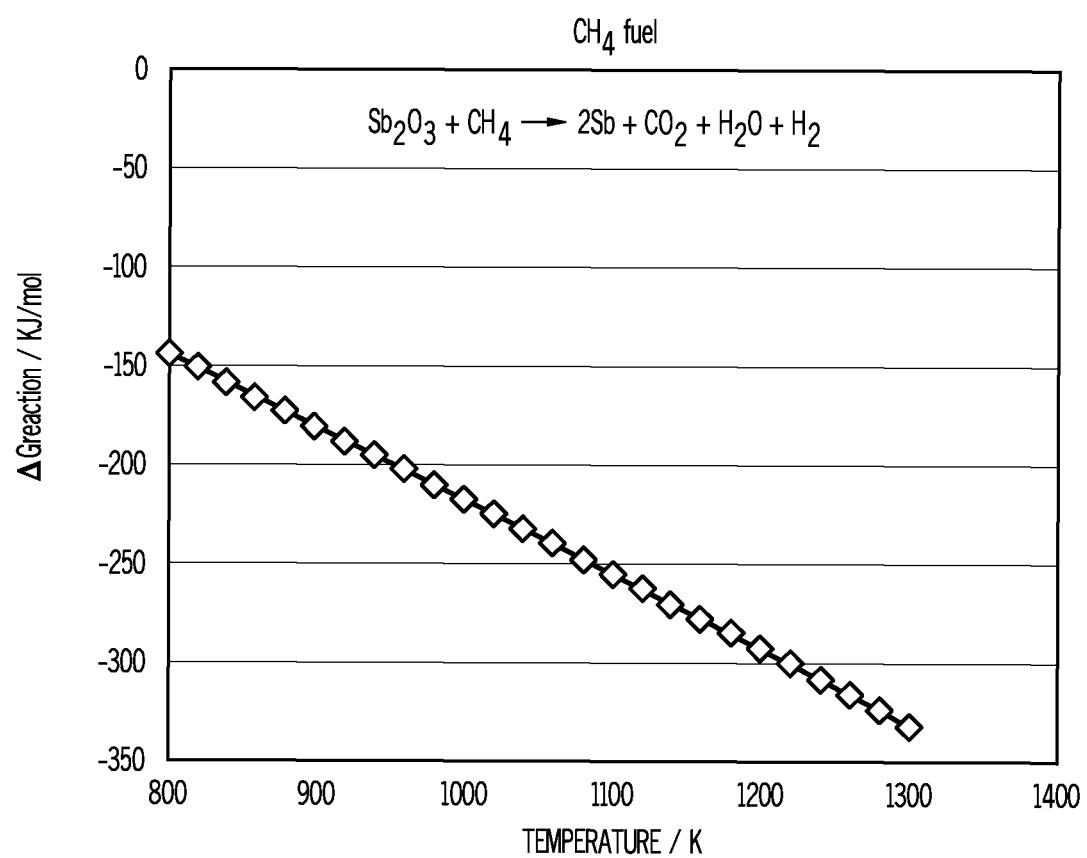
FIG. 11C is a graphical illustration depicting the effect of temperature on the free energy of the $Sb_2O_3$ reduction reaction ($\Delta G$) when using a methane fuel.

FIGS. 11A-11C show the effect of temperature on the free energy of the $Sb_2O_3$ reduction reaction ($\Delta G$) for the case of carbon (FIG. 11A), hydrogen (FIG. 11B) and methane fuel (FIG. 11C), respectively. As shown, the free energy of the reduction reaction at high temperatures is beneficially higher for carbon-containing fuels (FIGS. 11A and 11C).

Since organic sulfur compounds will be present in the hydrocarbon fuel mixture (here thiophene is used as an example) metal sulfide will be formed, while hydrogen formed by (R16) or (R11) will facilitate the saturation of the carbon atoms of the desulfurized organic compound (R17).

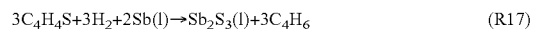
$$3C_4H_4S + 3H_2 + 2Sb(l) \rightarrow Sb_2S_3(l) + 3C_4H_6$$ (R17)

Figure 12A:
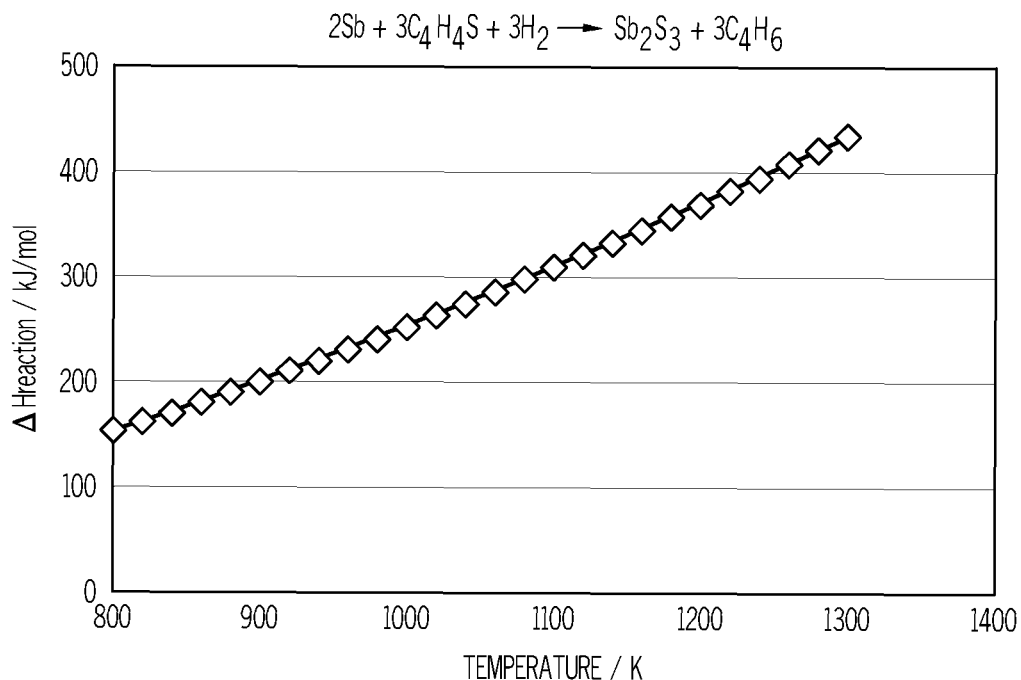
FIG. 12A is a graphical illustration depicting the effect of temperature on the enthalpy of the thiophene desulfurization reaction.
Figure 12B:
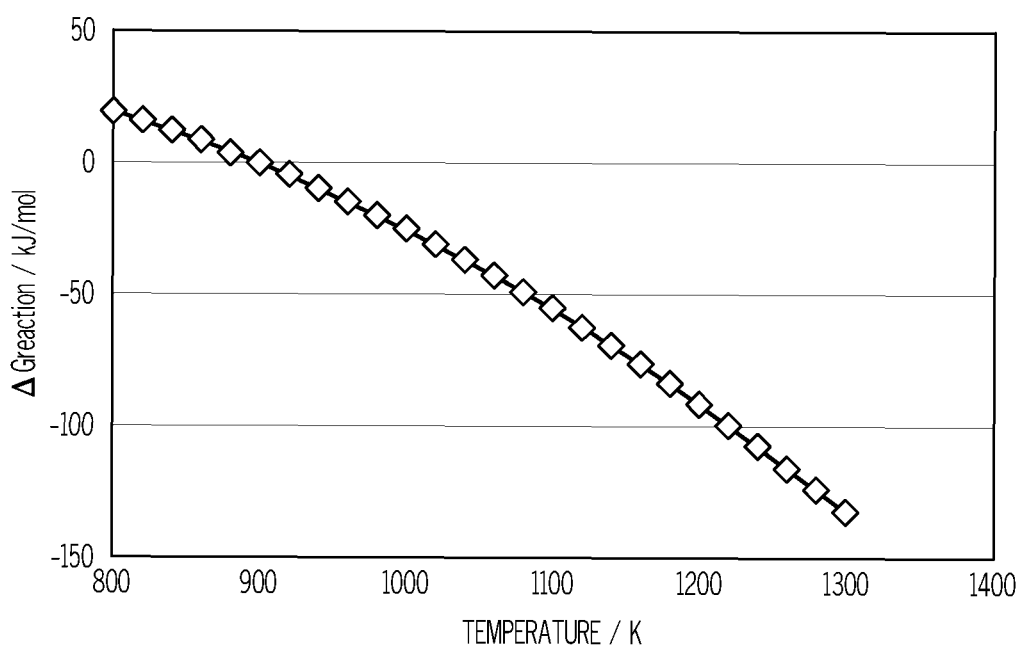
FIG. 12B is a graphical illustration depicting the effect of temperature on the free energy of the thiophene desulfurization reaction.

The effect of temperature on the enthalpy ($\Delta H$) and the free energy ($\Delta G$) of the thiophene desulfurization reaction (R17) is shown in FIGS. 12A and 12B. As shown, the reaction is endothermic in the examined temperature range (800-1300K or 527-1027° C.), while it becomes spontaneous at temperatures above 900K (630° C.), which coincides with the melting point of antimony (Sb).

FIGS. 12A and 12B show the effect of temperature on the enthalpy (left) and the free energy (right) of the thiophene desulfurization reaction. Antimony (Sb) is converted to antimony sulfide ($Sb_2S_3$) to upgrade the hydrocarbon fuel mixture.

It should be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A molten metal anode solid oxide fuel cell (MMA-SOFC) system comprising:
   a first MMA-SOFC comprising a first cathode, a first molten metal anode, and a first solid electrolyte disposed between the first cathode and the first molten metal anode;
   a second MMA-SOFC comprising a second cathode, a second molten metal anode, and a second solid electrolyte disposed between the second cathode and the second molten metal anode;
   a molten metal conduit configured to deliver molten metal from the first molten metal anode to the second molten metal anode;
   a fuel contactor integral with the first MMA-SOFC or in fluid communication with the first MMA-SOFC; and
   one or more external electric circuits, wherein
      the first molten metal anode comprises an oxidation region configured to oxidize the molten metal to produce metal oxides and electrons, and
      the fuel contactor comprises a regeneration region configured to reduce the metal oxides and produces metal sulfides in the molten metal upon reaction with sulfur-containing fuel;
      the second molten metal anode is configured to oxidize the metal sulfides in the metal sulfides-containing molten metal to produce metals and electrons; and the external electric circuits are configured to generate power from the electrons produced in both the first MMA-SOFC and the second MMA-SOFC; and wherein a solid metal anode is disposed between the second molten metal anode and the second solid electrolyte.

2. The system of claim 1 wherein the second solid metal anode comprises metals or metal-ceramics.

3. The system of claim 1 wherein the second solid metal anode comprises metal selected from the group consisting of iron (Fe), copper (Cu), nickel (Ni), cobalt (Co), and combinations thereof.

4. The system of claim 1 wherein the first molten metal anode, the second molten metal anode, or both comprises metal selected from the group consisting of tin (Sn), bismuth (Bi), indium (In), lead (Pb), antimony (Sb), copper (Cu), molybdenum (Mo), mercury (Hg), iridium (Ir), palladium (Pd), rhenium (Re), platinum (Pt), silver (Ag), arsenic (As), rhodium (Rh), tellurium (Te), selenium (Se), osmium (Os), gold (Au), germanium (Ge), thallium (Tl), cadmium (Cd), gadolinium (Gd), chromium (Cr), nickel (Ni), iron (Fe), tungsten (W), cobalt (Co), zinc (Zn), vanadium (V), and combinations thereof.

5. The system of claim 1 wherein the first molten metal anode, the second molten metal anode, or both comprises antimony.

6. The system of claim 1 wherein the first solid electrolyte, the second solid electrolyte, or both comprises zirconia-based electrolytes or ceria-based electrolytes.

7. The system of claim 6 wherein the zirconia-based electrolytes are selected from the group consisting of yttria stabilized $ZrO_2$ (YSZ), scandia stabilized $ZrO_2$ (ScSZ), calcia stabilized $ZrO_2$ (CSZ) and combinations thereof.

8. The system of claim 6 wherein the ceria-based electrolytes comprise rare earth doped ceria.

9. The system of claim 6 wherein the ceria-based electrolytes are selected from the group consisting of gadolinium doped ceria (GDC), yttria doped ceria (YDC), samarium doped ceria (SmDC), and combinations thereof.

10. The system of claim 1 wherein the first solid electrolyte, the second solid electrolyte, or both comprises of yttria stabilized $ZrO_2$ (YSZ).

11. The system of claim 1 wherein the first cathode, the second cathode, or both is selected from the group consisting of lanthanum strontium manganite (LSM), yttria stabilized $ZrO_2$/lanthanum strontium manganite (YSZ-LSM), lanthanum strontium cobalt ferrite (LSCF), and combinations thereof.

12. The system of claim 1 further comprising a fuel contactor in fluid communication with the first molten metal anode and the second molten metal anode.

13. The system of claim 12 wherein the fuel contactor comprises a porous ceramic, metal, or combinations thereof.

14. The system of claim 1 further comprising a sacrificial reducing agent downstream of the second molten metal anode and configured to reduce the metal oxides to metal.

15. The system of claim 14 wherein the sacrificial reducing agent is a graphite rod or one selected from the group consisting of iron (Fe), zirconium (Zr), manganese (Mn), tantalum (Ta), silicon (Si) or titanium (Ti) and combinations thereof.

16. The system of claim 1 further comprising $SO_2$ removal and treatment equipment downstream of the second molten metal anode.

17. The system of claim 16 wherein the $SO_2$ removal and treatment equipment comprises one or more units selected from the group consisting of a wet scrubber unit, a spray-dry unit, a wet $H_2SO_4$ processing unit, a $SNO_X$ flue-gas desulfurization unit, and combinations thereof.

18. The system of claim 1 further comprising a catalytic section of a Claus unit downstream of the second molten metal anode, the catalytic section of the Claus unit being configured to utilize $SO_2$ byproduct to catalytically convert $H_2S$ to elemental sulfur.

19. The system of claim 1 further wherein the sulfur-containing fuel is selected from the group consisting of hydrogen fuel, carbon fuel, hydrocarbon fuel, hydrogen sulfide, and mixtures thereof.

20. The system of claim 1 wherein the fuel contactor is integrated into the first MMA-SOFC.

21. The system of claim 1 wherein the fuel contactor is separate but in fluid communication with the first MMA-SOFC.

22. The system of claim 1 further comprising an additional fuel contactor in fluid communication with the second molten metal anode, wherein the additional fuel contactor comprises a sulfation region configured to produce metal sulfides in the molten metal.

23. A molten metal anode solid oxide fuel cell system (MMA-SOFC) comprising:
  a first MMA-SOFC comprising a first cathode, a first molten metal anode, and a first solid electrolyte disposed between the first cathode and the first molten metal anode, wherein the first molten metal anode is configured to oxidize molten metal to produce metal oxides and electrons;
  a second MMA-SOFC comprising a second cathode, a second molten metal anode, and a second solid electrolyte disposed between the second cathode and the second molten metal anode;
  a fuel contactor in fluid communication with the first MMA-SOFC and the second MMA-SOFC;
  a molten metal conduit configured to deliver molten metal between the first molten metal anode, the second molten metal anode, and the fuel contactor; and
  one or more external electric circuits configured to generate power from the electrons produced in both the first MMA-SOFC and the second MMA-SOFC, wherein,
    the fuel contactor comprises a regeneration region configured to reduce the metal oxides and produces metal sulfides in the molten metal upon reaction with sulfur-containing fuel and a sulfation region configured to produce metal sulfides from metals in molten metal delivered by the second molten metal anode, and
    the second molten metal anode is configured to oxidize metal sulfides in metal sulfides-containing molten metal to produce metals and electrons; and wherein a solid metal anode is disposed between the second molten metal anode and the second solid electrolyte.

24. The system of claim 23 wherein the molten metal conduit is configured to recycle metal sulfides produced in the sulfation region of the fuel contactor back to the second molten metal anode.

25. The system of claim 23 wherein the molten metal conduit is configured to recycle metals produced in the regeneration region of the fuel contactor back to the first molten metal anode.

26. The system of claim 23 wherein the sulfation region utilizes $H_2S$ to convert metal to metal sulfides and also produce $H_2$.

27. The system of claim 23 further comprising a sacrificial reducing agent downstream of the second molten metal anode and configured to reduce the metal oxides to metal.

28. The system of claim 23 further comprising $SO_2$ removal and treatment equipment downstream of the second molten metal anode.

29. The system of claim 23 further comprising a catalytic section of a Claus unit downstream of the second molten metal anode, the catalytic section of the Claus unit being configured to utilize $SO_2$ byproduct to catalytically convert $H_2S$ to elemental sulfur.

30. A method for co-generating electricity in two separate molten metal anode solid oxide fuel cells (MMA-SOFCs) comprising:
    producing metal oxides and electrons by oxidizing molten metal in a first molten metal anode of a first MMA-SOFC;
    producing metal and metal sulfides by reacting the molten metal and metal oxides with a sulfur-containing fuel;
    producing metals and electrons by oxidizing the metal sulfides in a second molten metal anode of a second MMA-SOFC; and
    co-generating electricity by collecting the electrons from the first MMA-SOFC and the second MMA-SOFC in an external electric circuit; and wherein a solid metal anode is disposed between the second molten metal anode and the second solid electrolyte.

31. A method for generating electricity from metal sulfide in an individual molten metal anode solid oxide fuel cell (MMA-SOFC) comprising:
    providing a MMA-SOFC comprising a cathode, a molten metal anode, a solid electrolyte disposed between the cathode and the molten metal anode, wherein the MMA-SOFC is in fluid communication with a fuel contactor;
    producing metal sulfides and $H_2$ in a molten metal stream by reacting molten metal with a sulfur-containing fuel comprising only $H_2S$, or one or more of $H_2S$, sulfur, sulfones, sulfoxides or combinations thereof;
    producing metals and electrons by oxidizing the metal sulfides containing molten metal in the molten metal anode of the MMA-SOFC; and
    generating electricity by collecting the electrons from the MMA-SOFC in an external electric circuit; and wherein a solid metal anode is disposed between the molten metal anode and the solid electrolyte.

32. The method of claim 31 further comprising reducing metal oxide byproducts to metals by utilizing a sacrificial reducing agent downstream of the molten metal anode.

33. The method of claim 31 further comprising removing or treating $SO_2$ byproducts by utilizing $SO_2$ removal and treatment equipment downstream of the molten metal anode.

34. The method of claim 31 further providing a catalytic section of a Claus unit downstream of the molten metal anode, wherein the catalytic section of the Claus unit utilizes $SO_2$ byproduct to catalytically convert the $H_2S$ to elemental sulfur.

35. The method of claim 31 wherein the molten metal anode is connected to the fuel contactor via a molten metal conduit.

\* \* \* \* \*